(12) United States Patent
Okada et al.

(10) Patent No.: US 8,707,818 B2
(45) Date of Patent: Apr. 29, 2014

(54) STEERING DEVICE

(75) Inventors: Shinji Okada, Maebashi (JP); Kou Yamamoto, Maebashi (JP)

(73) Assignee: NSK Ltd., Tokyo (JP)

( * ) Notice: Subject to any disclaimer, the term of this patent is extended or adjusted under 35 U.S.C. 154(b) by 85 days.

(21) Appl. No.: 13/379,245

(22) PCT Filed: Jul. 27, 2011

(86) PCT No.: PCT/JP2011/067043
§ 371 (c)(1),
(2), (4) Date: Jul. 11, 2012

(87) PCT Pub. No.: WO2012/035891
PCT Pub. Date: Mar. 22, 2012

(65) Prior Publication Data
US 2012/0272778 A1    Nov. 1, 2012

(30) Foreign Application Priority Data

Sep. 14, 2010    (JP) ................................. 2010-205255

(51) Int. Cl.
*B62D 1/18*    (2006.01)
(52) U.S. Cl.
USPC ........................................... 74/493; 280/775

(58) Field of Classification Search
USPC ...................................... 74/492, 493; 280/775
See application file for complete search history.

(56) References Cited

U.S. PATENT DOCUMENTS

| | | | | |
|---|---|---|---|---|
| 5,213,004 A | * | 5/1993 | Hoblingre | 74/493 |
| 5,301,567 A | * | 4/1994 | Snell et al. | 74/493 |
| 7,717,011 B2 | * | 5/2010 | Hirooka | 74/493 |
| 2004/0134302 A1 | * | 7/2004 | Ko et al. | 74/493 |

* cited by examiner

*Primary Examiner* — Justin Krause
(74) *Attorney, Agent, or Firm* — Crowell & Moring LLP

(57) ABSTRACT

A steering device is provided in which fastening of a column is carried out smoothly, meshing of a movable tilt lock gear and a fixed tilt lock gear is carried out smoothly when tilting is clamped, and a rigidity can be increased when the tilting is clamped. A side plate on a left side to which a fixed tilt lock gear is attached is restrained from being elastically deformed by a rib. Therefore, in tilting and clamping and telescopically clamping, positions of the fixed tilt lock gear and a movable tilt lock gear in a vehicle width direction relative to each other is not varied, and therefore, the movable tilt lock gear and the fixed tilt lock gear are brought in mesh with each other smoothly.

7 Claims, 19 Drawing Sheets

(a)

(b)

(c)

(a)

(b)

(a)

(b)

STEERING DEVICE

TECHNICAL FIELD

The present invention relates to a steering device, particularly relates to a steering device of a tilt type which can adjust a tilt position of a steering wheel in accordance with a physical configuration of a driver and a driving attitude thereof, or a tilt telescopic type using both of the tilt type and a telescopic type.

BACKGROUND ART

A tilt position adjusting mechanism is a mechanism for adjusting an angle of inclination of a steering wheel to a position which is the easiest to drive by adapting to a figure and preference of a driver. When the angle of inclination of the steering wheel is adjusted, a tilting clamp mechanism is brought into an unclamped state once, the angle of inclination of the steering wheel is adjusted continuously under the state, and thereafter, the tilting clamp mechanism is brought into a clamped state again.

According to the steering device having the tilt position adjusting mechanism, a vehicle attaching bracket is fixed to a vehicle body, and a fastening rod is inserted to a tilt adjusting long groove of the vehicle body attaching bracket and a column. When tilting is clamped, the fastening rod is fastened by pressing a fixed cam in an axial direction by a movable cam which is pivoted by operating an operating lever, and the column is pressed to the vehicle body attaching bracket to clamp. However, when a fastening force of the fastening rod is weak, in second collision in which a driver is crashed to the steering wheel, the column is moved in a tilting direction, and there is a concern that an air bag provided the steering cannot receive a passenger at an effective position.

As a mechanism for preventing the column from being moved in the second collision, there is a tilt clamp mechanism in which a fixed tilt lock gear is installed at a side plate of the vehicle body attaching bracket, and a movable tilt lock gear which is brought in mesh with the fixed tilt lock gear is inserted to the fastening rod.

According to the configuration, when tilting is clamped, by bringing the movable tilt lock gear in mesh with the fixed tilt lock gear by fastening the fastening rod, a holding force in the tilting direction is increased, and even when an impact load by the second collision is operated to the steering wheel, the column is prevented from being moved in the tilting direction.

According to the steering device which increases the holding force in the tilting direction in this way, when the tilting is clamped, if the fastening rod is fastened, the side plate attached with the fixed tilt lock gear is elastically deformed. Therefore, positions of the movable tilt lock gear and the fixed tilt lock gear in a vehicle width direction relative to each other are changed, and there is a concern that meshing of the movable tilt lock gear and the fixed lock gear is failed.

According to a steering device of Japanese Unexamined Patent Application Publication No. 2008-137393 which is installed with a tilting clamp mechanism, a movable tilt lock gear is outwardly fitted to a movable cam with a clearance therebetween, and an elastic member in a ring-like shape is inserted between the movable cam and the movable tilt lock gear, and a washer made of a resin is interposed between the movable tilt lock gear and an operating lever to fasten to a fastening rod. Thereby, the movable tilt lock gear is made to be able to move in a tilting direction and in a vehicle width direction relative to the movable cam, and a degree of freedom is provided to a position at which the movable tilt lock gear and the fixed tilt lock gear are brought in mesh with each other.

However, according to the steering device of Japanese Unexamined Patent Application Publication No. 2008-137393 which is installed with the tilting clamp mechanism, titling is clamped by way of the elastic member in the ring-like shape, and therefore, it is difficult to increase a rigidity when tilting is clamped. Further, the elastic member in the ring-like shape is compressed when tilting is clamped, and therefore, it is not easy to select an elastic material which has a sufficient durability from elastic materials of rubber and the like as the material of the elastic member in the ring-like shape.

According to a steering device of Japanese Examined Utility Model Application Publication No. 59-41892 which is installed with a tilt clamp mechanism, one side plate of a vehicle body attaching bracket is reinforced by a rib, the other side plate a rigidity of which is reduced is elastically deformed in a vehicle width direction, tilting is clamped by pressing a column to the vehicle body attaching bracket, and a rigidity of the vehicle body attaching bracket is increased when tilting is clamped. However, the steering device of Japanese Examined Utility Model Application Publication No. 59-41892 which is installed with the tilt clamp mechanism is not applied to a tilt clamp mechanism in which a holding force in a tilting direction is increased by bringing a movable tilt lock gear in mesh with a fixed lock gear.

Japanese Unexamined Patent Application Publication No. 2008-137393

Japanese Examined Utility Model Application Publication No. 59-41892

SUMMARY OF THE INVENTION

Problems to be Solved by the Invention

It is a problem of the present invention to provide a steering device in which a column is fastened smoothly, a movable tilt lock gear and a fixed tilt lock gear are smoothly brought in mesh with each other when tilting is clamped, and a rigidity is increased when tilting is clamped.

Means for Solving the Problem

The problems described above are solved by the following means. That is, a first aspect of the present invention is a steering device characterized in including a vehicle body attaching bracket which can be attached to a vehicle body, a column in which a tilt position thereof is supported adjustably by the vehicle body attaching bracket, and a steering shaft mounted with a steering wheel is axially supported pivotably, a fastening rod which is inserted to a tilt adjusting long groove formed at a side plate and the column in order to fasten to clamp the column to a left and right pair of the side plates of the vehicle body attaching bracket at a desired tilt position, a fixed cam which is supported by one end of the fastening rod and presses an inner side face of one of the side plates of the vehicle body attaching bracket to the column, a movable cam which is supported pivotably by the one end of the fastening rod along with an operating lever opposedly to the fixed cam, a cam face which is provided to each of faces of the fixed cam and the movable cam opposed to each other, and presses the movable cam to the fixed cam relatively in an axial direction, a detent portion which is formed at the fixed cam in order to make the fixed cam unable to rotate relative to the movable cam, is inwardly fitted to the tilt adjusting long groove, and is made to be slidable along the tilt adjusting long groove in adjusting a tilt position of the column, a fixed tilt lock gear which is attached to an outer side face of the one of side plates of the vehicle body attaching bracket, a movable tilt lock gear which is pivoted in synchronism with an operation of pivoting the operating lever and can be brought in mesh with the fixed tilt lock gear, and a rib which is formed along the tilt adjusting long groove at a vicinity of the tilt adjusting long groove of the one of side plates, and restrains an elastic deformation of the one of side plates 5 when the column is fastened to clamp.

A second aspect of the present invention is the steering device according to the first aspect of the present invention, characterized in that the rib is formed between the fixed tilt lock gear and an upper plate of the vehicle body attaching bracket.

A third aspect of the present invention is the steering device according to the first aspect of the present invention, characterized in including a gap which is formed at a portion of connecting the other of side plates of the vehicle body attaching bracket to the upper plate of the vehicle body attaching bracket, and facilitates an elastic deformation of the other of side plates when the column is fastened to clamp.

A fourth aspect of the present invention is the steering device according to the third aspect of the present invention, characterized in that the gap is opened on a rear side thereof in view of a vehicle body.

A fifth aspect of the present invention is the steering device of the present invention according to any one of the first aspect through the fourth aspect of the present invention, characterized in including the movable tilt lock gear which is outwardly fitted to the fixed cam movably in a tilting direction, and a spring which is interposed between the movable tilt lock gear and the fixed cam, sandwiches an outer peripheral face of the fixed cam, and elastically supports a movement of the movable tilt lock gear in the tilting direction relative to the fixed cam.

A sixth aspect of the present invention is the steering device according to the fifth aspect of the present invention, characterized in that when ridges of the movable tilt lock gear and the fixed tilt lock gear are brought into contact with each other in fastening the column to the vehicle body attaching bracket, the spring is elastically deformed by a reaction force thereof, and the movable tilt lock gear is moved in the tilting direction relative to the fixed tilt lock gear.

A seventh aspect of the present invention is the steering device according to the sixth aspect of the present invention, characterized in that when the column is released from fastening the vehicle body attaching bracket, meshing of the movable tilt lock gear to the fixed tilt lock gear is made to be easy to be disengaged by a gap between the fixed cam and the movable tilt lock gear in an up and down direction of the vehicle body.

Effect of the Invention

The steering device of the present invention includes the fastening rod which is inserted to the tilt adjusting long groove formed at the side plate and the column in order to fasten to clamp the column to the left and right pair of side plates of the vehicle body attaching bracket at the desired tilt position, the fixed tilt lock gear which is attached to the outer side face of the one of side plates of the vehicle body attaching bracket, the movable tilt lock gear which is pivoted in synchronism with the operation of pivoting the operating lever and can be brought in mesh with the fixed tilt lock gear, the rib which is formed along the tilt adjusting long groove at the vicinity of the tilt adjusting long groove of the one of side plates, and restrains the elastic deformation of the one of side plates when the column is fastened to clamp, and the gap which is formed at the portion of connecting the other of side plates and the upper plate.

The one of side plates to which the fixed tilt lock gear is attached is restrained from being elastically deformed by the rib, and the other of side plates includes the gap at the portion of being connected to the upper plate. Therefore, when the column is fastened to clamp, a variation in the positions in the vehicle width direction of the fixed tilt lock gear and the movable tilt lock gear relative to each other is restrained, and therefore, the movable tilt lock gear and the fixed tilt lock gear are smoothly brought in mesh with each other while making fastening of the column smooth.

MODE FOR CARRYING OUT THE INVENTION

In the following embodiment, an explanation will be given of an example of applying the present invention to a steering device of a tilt telescopic type which adjusts positions of both of a position in an up and down direction and a position in a front or rear direction of a steering wheel.

Figure 1:
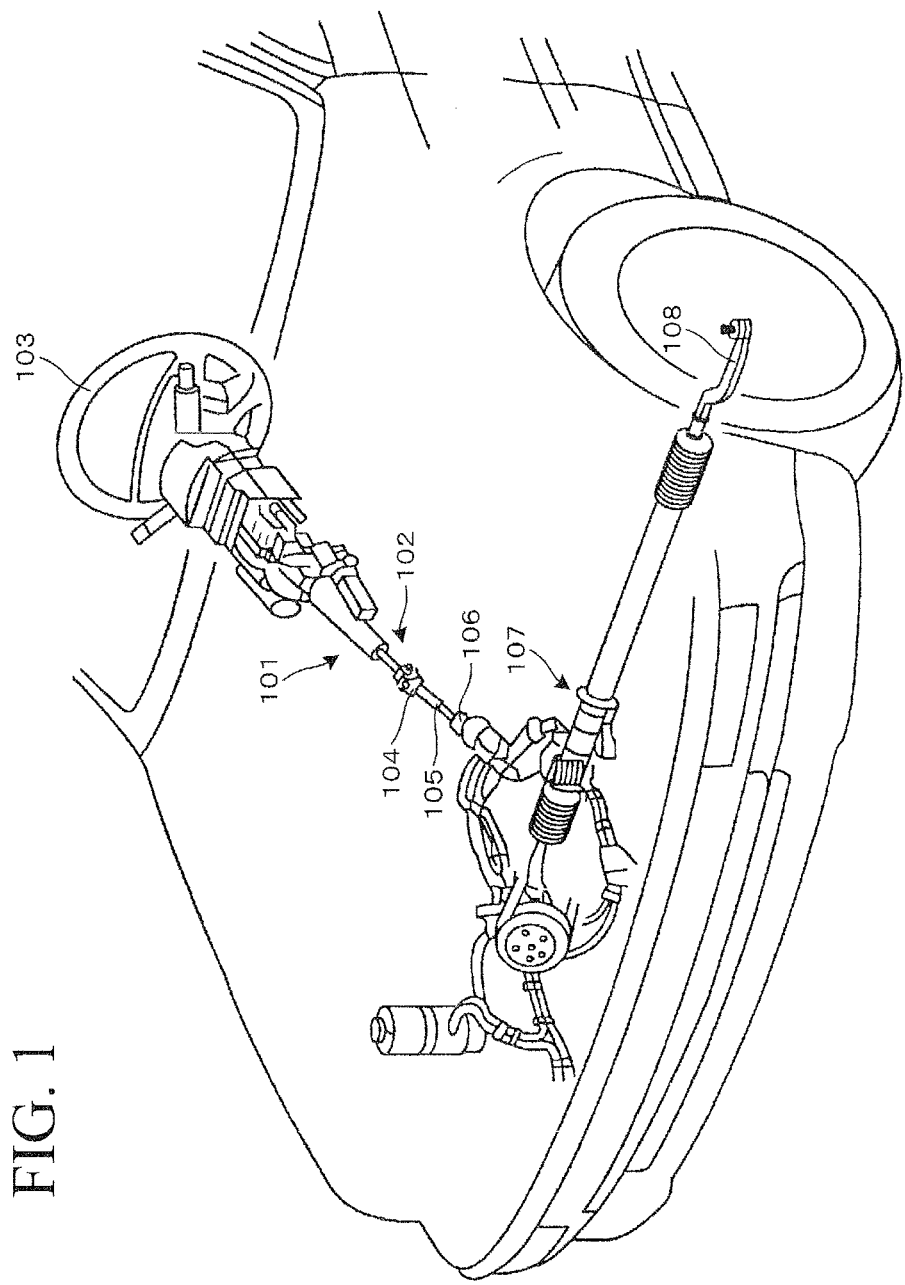
FIG. 1 is a total perspective view showing a state of attaching a steering device 101 of the present invention to a vehicle.

FIG. 1 is a total perspective view showing a state of mounting a steering device 101 of the present invention to a vehicle. The steering device 101 axially supports a steering shaft 102 pivotably. The steering shaft 102 is mounted with a steering wheel 103 at an upper end thereof (on a rear side of a vehicle body), and a lower end (on a front side of the vehicle body) of the steering shaft 102 is connected with an intermediate shaft 105 via a universal joint 104.

The intermediate shaft 105 is connected with a universal joint 106 at a lower end thereof, and the universal joint 106 is connected with a steering gear 107 configured by a rack and pinion mechanism or the like.

When a driver operates to rotate the steering wheel 103, a turning force thereof is transmitted to the steering gear 107 via the steering shaft 105, and the universal joint 104, the intermediate shaft 105, and the universal joint 106, a tie rod 108 is moved via the rack and pinion mechanism, and a steering angle of a wheel can be changed.

Figure 2:
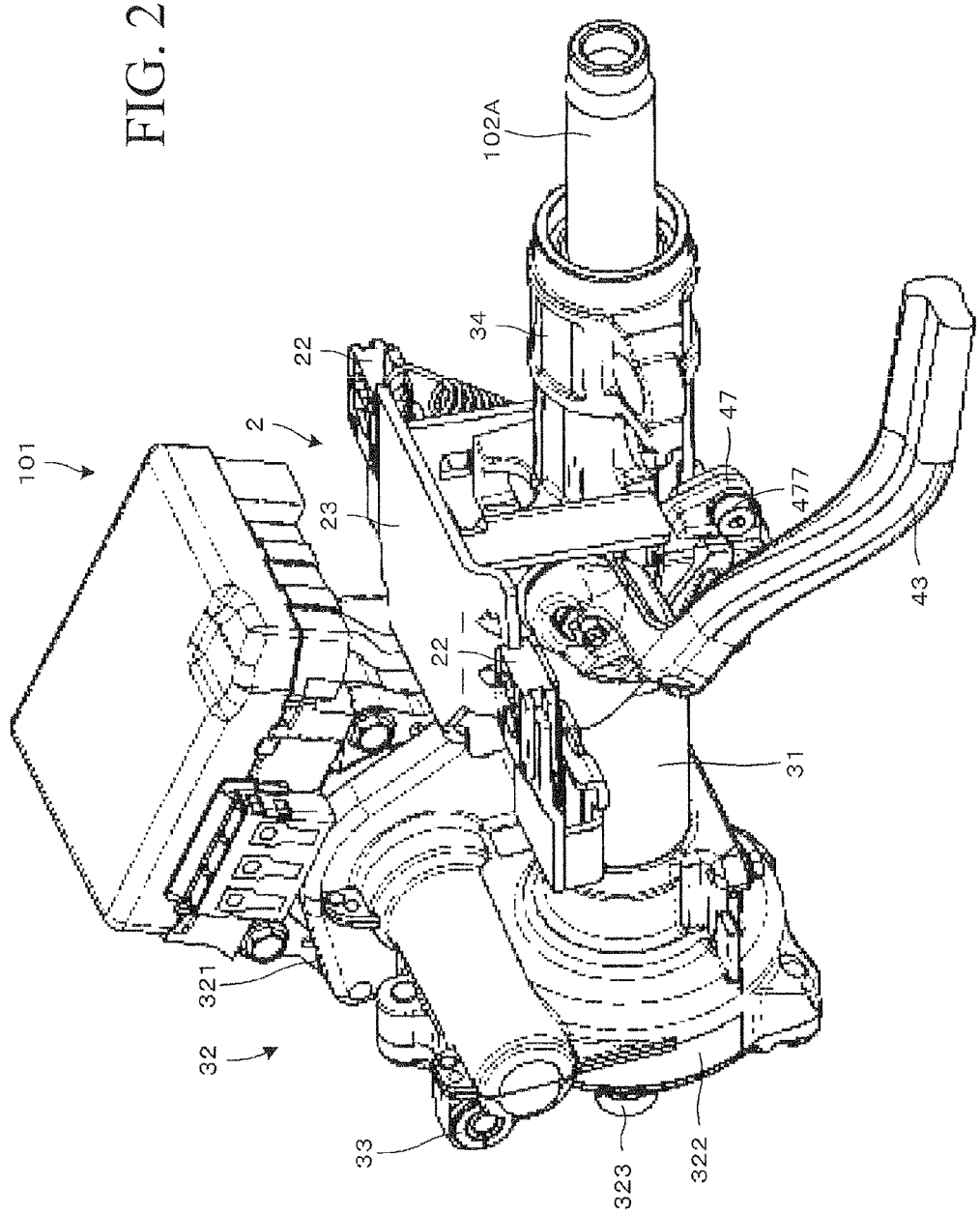
FIG. 2 is a perspective view of an essential portion viewing the steering device 101 of an embodiment of the present invention from a left upper side on a rear side of a vehicle body.
Figure 3:
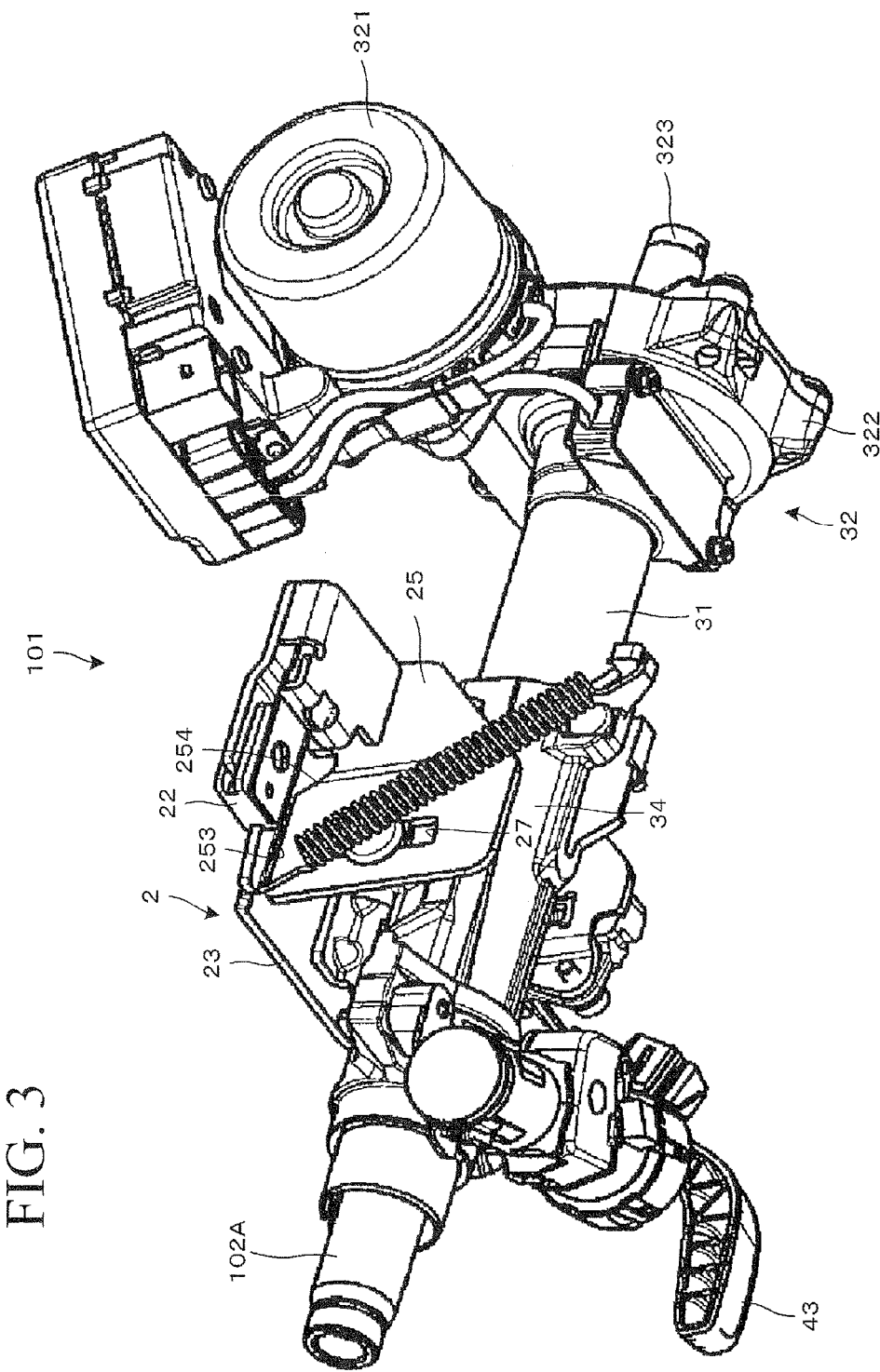
FIG. 3 is a perspective view of an essential portion viewing the steering device 101 of the embodiment of the present invention from a right lower side on the rear side of the vehicle body.
Figure 4:
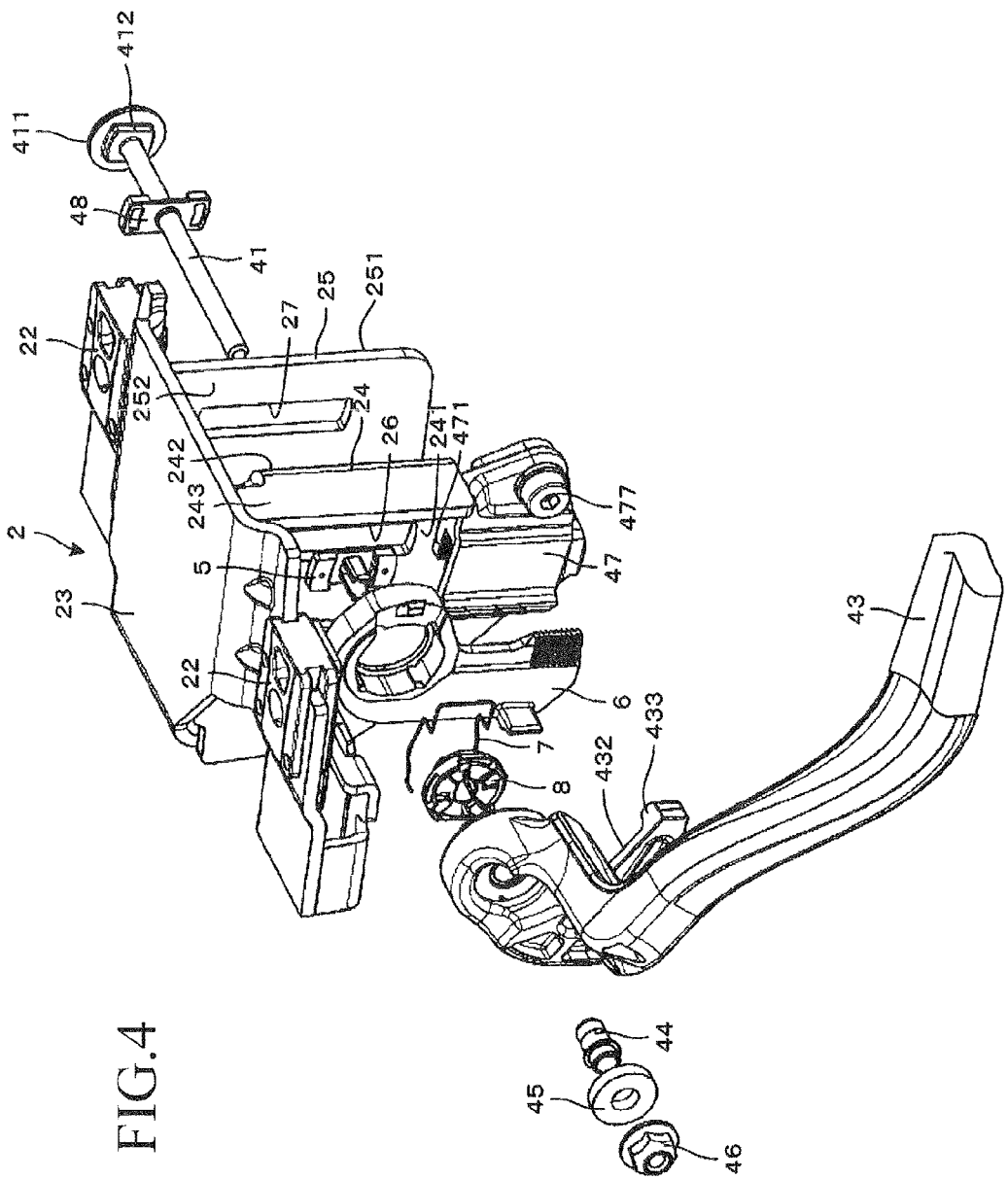
FIG. 4 is a disassembled perspective view viewing a surrounding of a vehicle body attaching bracket from the left upper side on the rear side of the vehicle body.
Figure 5:
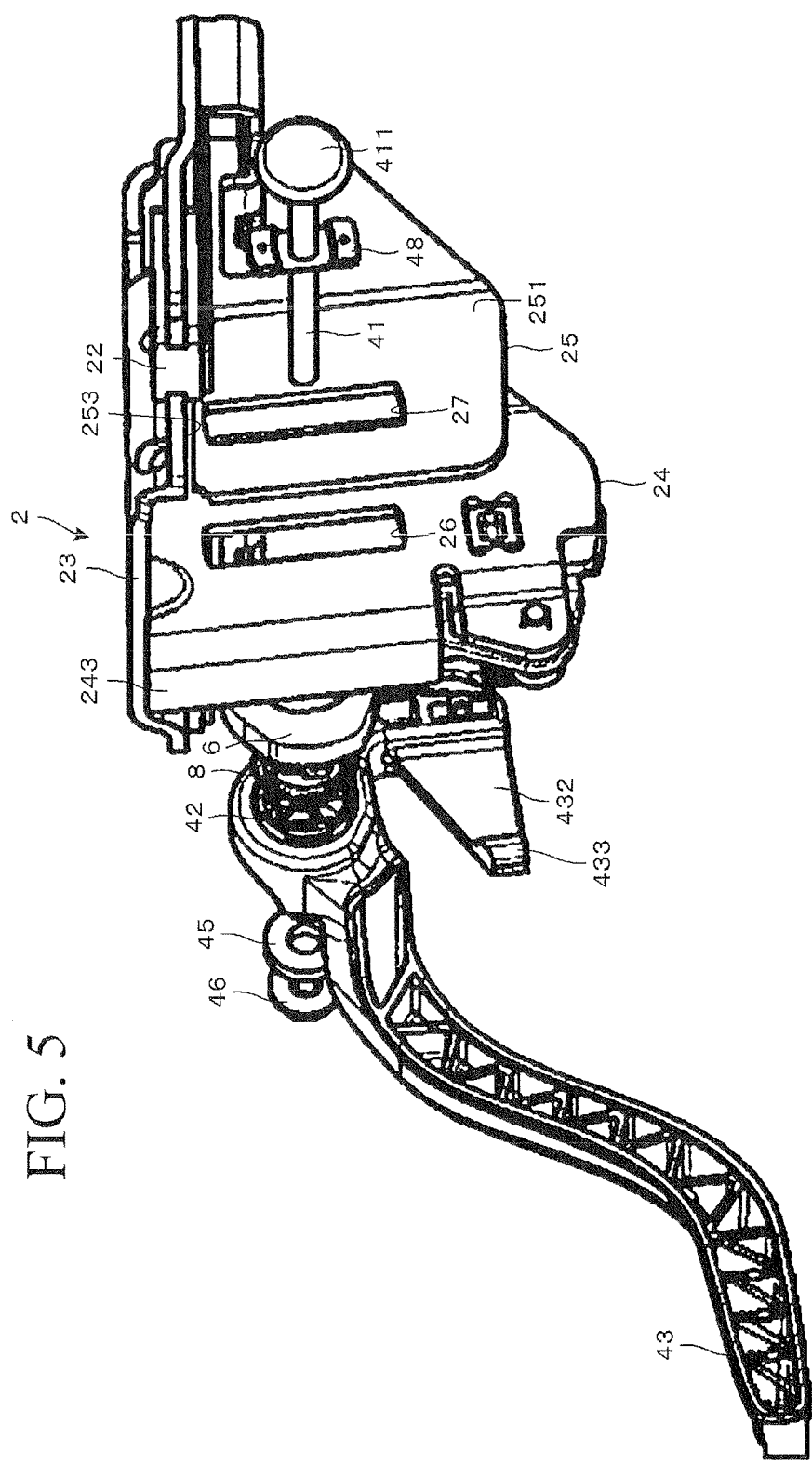
FIG. 5 is a disassembled perspective view viewing the surrounding of the vehicle body attaching bracket from the right lower side on the rear side of the vehicle body.
Figure 6:
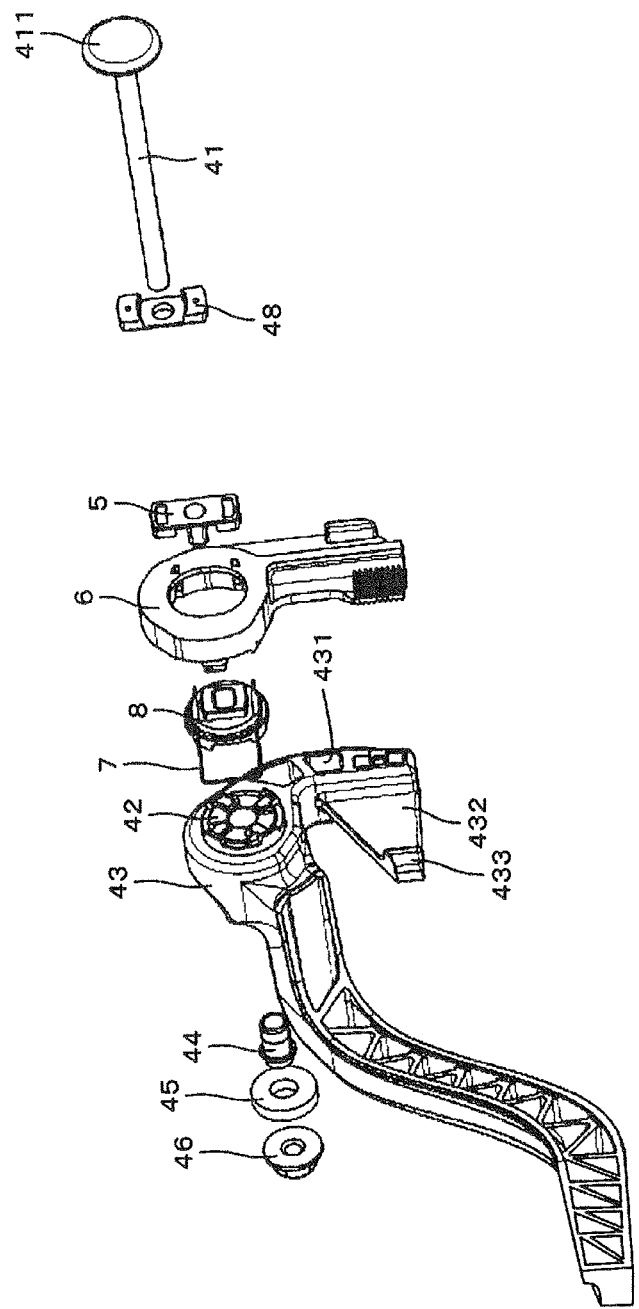
FIG. 6 is a disassembled perspective view omitting the vehicle body attaching bracket from FIG. 5.

FIG. 2 is a perspective view of an essential portion viewing the steering device 101 of an embodiment of the present invention from a left upper side on a rear side of a vehicle body. FIG. 3 is a perspective view of an essential portion viewing the steering device 101 of the embodiment of the present invention from a right lower side on the rear side of the vehicle body. FIG. 4 is a disassembled perspective view viewing a surrounding of a vehicle body attaching bracket from a left upper side on the rear side of the vehicle body, FIG. 5 is a disassembled perspective view viewing the surrounding of the vehicle body attaching bracket from a right lower side on the rear side of the vehicle body, and FIG. 6 is a disassembled perspective view omitting the vehicle body attaching bracket from FIG. 5.

As shown in FIG. 2 and FIG. 3, the steering device 101 of the embodiment of the present invention is configured by a vehicle body attaching bracket 2, an inner column (lower column) 31, a steering assisting portion 32 (electric assisting mechanism), an outer column (upper column) 34 and the like.

A rear end in view of the vehicle body of the steering assisting portion (electric assisting mechanism) 32 is fixed to a front side in view of the vehicle body (left side of FIG. 2) of the inner column 31 by press fitting. The steering assisting portion 32 is configured by an electric motor 321, a reduction gearbox portion 322, an output shaft 323 and the like. In the steering assisting portion 32, a bracket 33 which is integrally formed to a front end in view of the vehicle body of the steering assisting portion 32 is supported by a vehicle body, not illustrated, to be able to adjust a tilt position via a tilt center axis, not illustrated.

An inner peripheral face of the outer column 34 is outwardly fitted to an outer peripheral face of the inner column 31 to be able to adjust a telescopic position (slidably move in parallel with a center axis line of the inner column 31). An upper side shaft 102A is axially supported pivotably by the outer column 34, and the steering wheel 103 (refer to FIG. 1) is fixed to an end portion on a rear side in view of the vehicle body (right side of FIG. 2) of the upper steering shaft 102A. A lower side in view of the vehicle body of the outer column 34 is formed with a slit (not illustrated) penetrating from an outer peripheral face to the inner peripheral face of the outer column 34. The slit has a shape in which a side of a front end in view of the vehicle body of the outer column 34 is opened, and a side of a rear end in view of the vehicle body is closed.

A lower steering shaft, not illustrated, is axially supported pivotably by the inner column 31, and the lower steering shaft is fitted to the upper steering shaft 102A by a spline. Therefore, rotation of the upper steering shaft 102A is transmitted to the lower steering shaft regardless of a telescopic position of the outer column 34.

The steering assisting portion 32 detects a torque operated to the lower steering shaft, and rotates the output shaft 323 by a necessary steering assisting force by driving the electric motor 321. Rotation of the output shaft 323 is transmitted to the steering gear 107 by way of the universal joint 104, the intermediate shaft 105, and the universal joint 106, and a steering angle of a wheel can be changed.

The vehicle body attaching bracket 2 which sandwiches the outer column 34 from both left and right sides in a vehicle width direction is attached to a front side in view of the vehicle body (left side of FIG. 2, right side of FIG. 3) of the outer column 34. As shown from FIG. 2 to FIG. 5, the vehicle body attaching bracket 2 includes an upper plate 23 which is formed substantially horizontally in the vehicle width direction, and a pair of left and right side plates 24 and 25 which are extended from the upper plate 23 to a lower side in view of the vehicle body, and squeeze to hold the outer column 34 from both left and right sides in the vehicle width direction.

Notched grooves (which are formed by opening a rear side in view of the vehicle body), not illustrated, are formed on both left and right sides in the vehicle width direction of the upper plate 23, and the upper plate 23 is attached to the vehicle body via capsules 22, 22 which are fitted to the notched grooves.

According to the vehicle body attaching bracket 2 and the outer column 34, when a driver is impacted to the steering wheel 103 in second collision and a large impact force is operated thereto, the vehicle body attaching bracket 2 is detached from the capsules 22 to the front side of the vehicle body, collapsingly moved to the front side of the vehicle body by being guided by the inner column 31, and absorbs an impact energy in collision.

A pair of clamp members, not illustrated, is integrally formed on the front Side in view of the vehicle body of the outer column 34 by being protruded from the outer column 34 to outer sides in the vehicle width direction. The clamp member is formed with a telescopic position adjusting long groove, not illustrated, which is extended to prolong in an axis center direction of the outer column 34. Further, the side plates 24 and 25 of the vehicle body attaching bracket 2 are formed with tilt adjusting long grooves 26 and 27. The tilt adjusting long grooves 26 and 27 are formed in a shape of a circular arc centering on a tilt center axis. Outer side faces of the clamp members of the outer column 34 are slidably brought into contact with inner side faces 242 and 252 of the side plates 24 and 25 of the vehicle body attaching bracket 2.

A fastening rod 41 in a shape of a round bar is inserted from right sides of FIG. 4 and FIG. 6 by passing the tilt adjusting long grooves 26 and 27 and telescopic position adjusting long grooves. A tilt stopper 48 is outwardly fitted to the fastening rod 41, and a left end of the fastening rod 41 is passed through the tilt position adjusting long groove 27 on the right side, the telescopic position adjusting long groove on the right side, the telescopic position adjusting long groove on the left side, and the tilt adjusting long groove 26 on the left side. Successively, a tilt stopper 5, a movable tilt lock gear 6, a wire spring (spring) 7, a fixed cam 8, a movable cam 42, an operating lever 43, a collar 44, and a thrust bearing 45 are outwardly fitted to a left end side of the fastening rod 41 successively from the right side, and a nut 46 is fastened to fix to the left end of the fastening rod 41.

A detent portion 412 in a rectangular shape is formed at a head portion 411 in a shape of a circular disk at the right end of the fastening rod 41. The detent portion 412 is fitted to the tilt adjusting long groove 27 on a right side, and the fastening rod 41 is made to stop pivoting relative to the side plate 25. The tilt stopper 48 on a right side is made of a synthetic resin, has substantially a rectangular shape prolonged in a tilting direction, and is formed by a width between two faces of a dimension substantially the same as a groove width of the tilt adjusting long groove 27. Therefore, the tilt stopper 48 on the right side is inwardly fitted to the tilt adjusting long groove 27, slidably moved smoothly in a tilt adjusting direction when a tilt position of the outer column 34 is adjusted, and alleviates an impact by being brought into contact with an end portion of the tilt adjusting long groove 27 at a tilt adjusting end. The movable cam 42 is press-fit to the operating lever 43 made of a synthetic resin, and is pivoted integrally with the operating lever 43.

Figure 7:
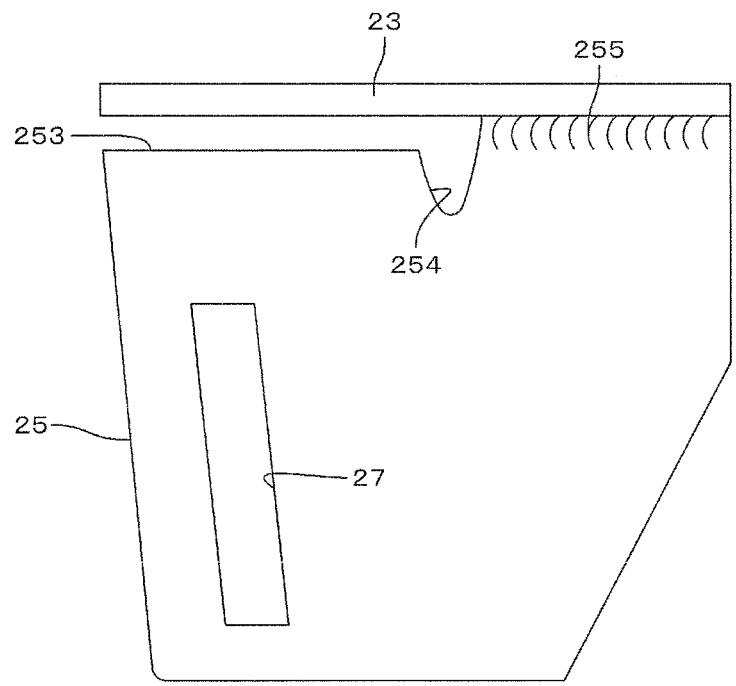
FIG. 7 is a front view of a side plate 25 on a right side of the vehicle body attaching bracket 2.
Figure 8:
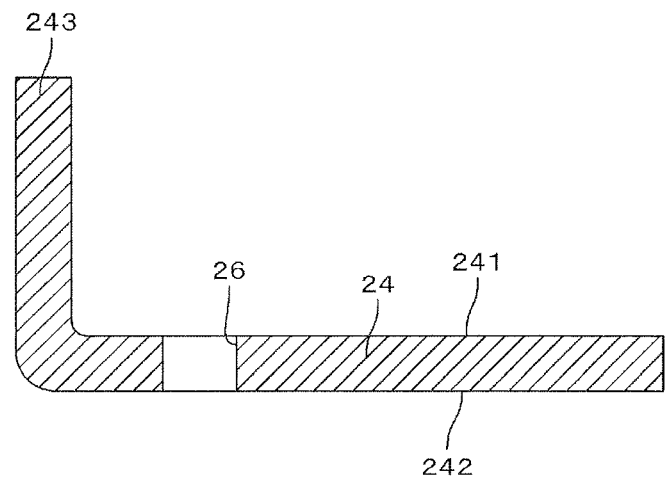
FIG. 8 is a cross-sectional view of a side plate 24 on a left side of the vehicle body attaching bracket 2.

FIG. 7 is a front view of the side plate 25 on the right side of the vehicle body attaching bracket 2, and FIG. 8 is a cross-sectional view of the side plate 24 on the left side of the vehicle body attaching bracket 2. As shown in FIG. 4, FIG. 5, and FIG. 8, a rear end in view of the vehicle body of the side plate 24 is formed with a rib 243 folded from the side plate 24 in right angle to an outer side in a vehicle width direction. The rib 243 is formed along the tilt adjusting long groove 26 at a vicinity of the tilt adjusting long groove 26. Further, an upper end in view of the vehicle body of the rib 243 is fixed to the upper plate 23 of the vehicle body attaching bracket 2 by welding.

Although a lower end in view of the vehicle body of the rib 243 is formed up to an upper end of a fixed tilt lock gear 47 described later, the lower end may be formed by being extended to a lower end of the fixed tilt lock gear 47. Therefore, a rigidity of a vicinity of the tilt adjusting long groove 26 of the side plate 24 is increased by the rib 243, and when the operating lever 43 is operated to pivot in order to clamp the outer column 34 to the vehicle body attaching bracket 2, an elastic deformation of the side plate 24 is restrained.

Figure 9:
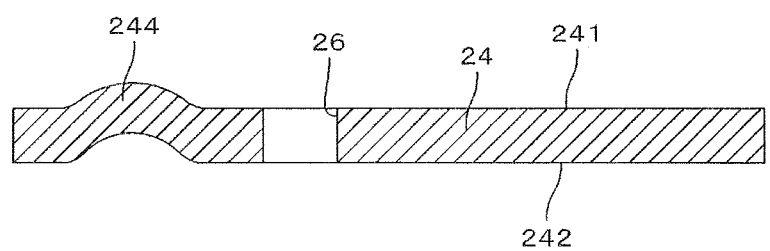
FIG. 9 is a cross-sectional view showing a modified example of the side plate 24 on the left side of the vehicle body attaching bracket 2.

FIG. 9 is a cross-sectional view showing a modified example of the side plate 24 on the left side. As shown in FIG. 9, a rear side in view of the vehicle body (left side of FIG. 9) of the side plate 24 on the left side is formed with a rib 244 in a shape of a semicircular arc protruded from the side plate 24 to the outer side in the vehicle width direction. The rib 244 is formed along the tilt adjusting long groove 26 at a vicinity of the tilt adjusting long groove 26. Further, an upper end in view of the vehicle body of the rib 244 is fixed to the upper plate 23 of the vehicle body attaching bracket 2 by welding. Therefore, a rigidity of a vicinity of the tilt adjusting long groove 26 of the side plate 24 is increased by the rib 244, and when the operating lever 43 is operated to pivot in order to clamp the outer column 34 to the vehicle body attaching bracket 2, the elastic deformation of the side plate 24 is restrained.

Further, as shown in FIG. 3, FIG. 5, and FIG. 7, in an upper end in view of the vehicle body of the side plate 25 on the right side, a front side in view of the vehicle body (right side of FIG. 7) is fixed to the upper plate 23 of the vehicle body attaching bracket 2 by welding 255. Further, a rear side in view of the vehicle body (left side of FIG. 7) of an upper end in view of the vehicle body of the side plate 25 is formed with a gap 253 between the rear side and the upper plate 23 of the vehicle body attaching bracket 2, and a rear side in view of the vehicle body of the gap 253 is opened. Further, a front end in view of the vehicle body of the gap 253 is formed with a slit 254. The slit 254 has an effect of preventing a welding strain when the side plate 25 is fixed to the upper plate 23 by the welding 255 from reaching a vicinity of the tilt adjusting long groove 27. Therefore, a rigidity of a vicinity of the tilt adjusting long groove 27 of the side plate 25 is reduced by the gap 253 and the slit 254, and when the operating lever 43 is operated to pivot in order to clamp the outer column 34 to the vehicle body attaching bracket 2, the elastic deformation of the side plate 25 is facilitated.

Figure 10:
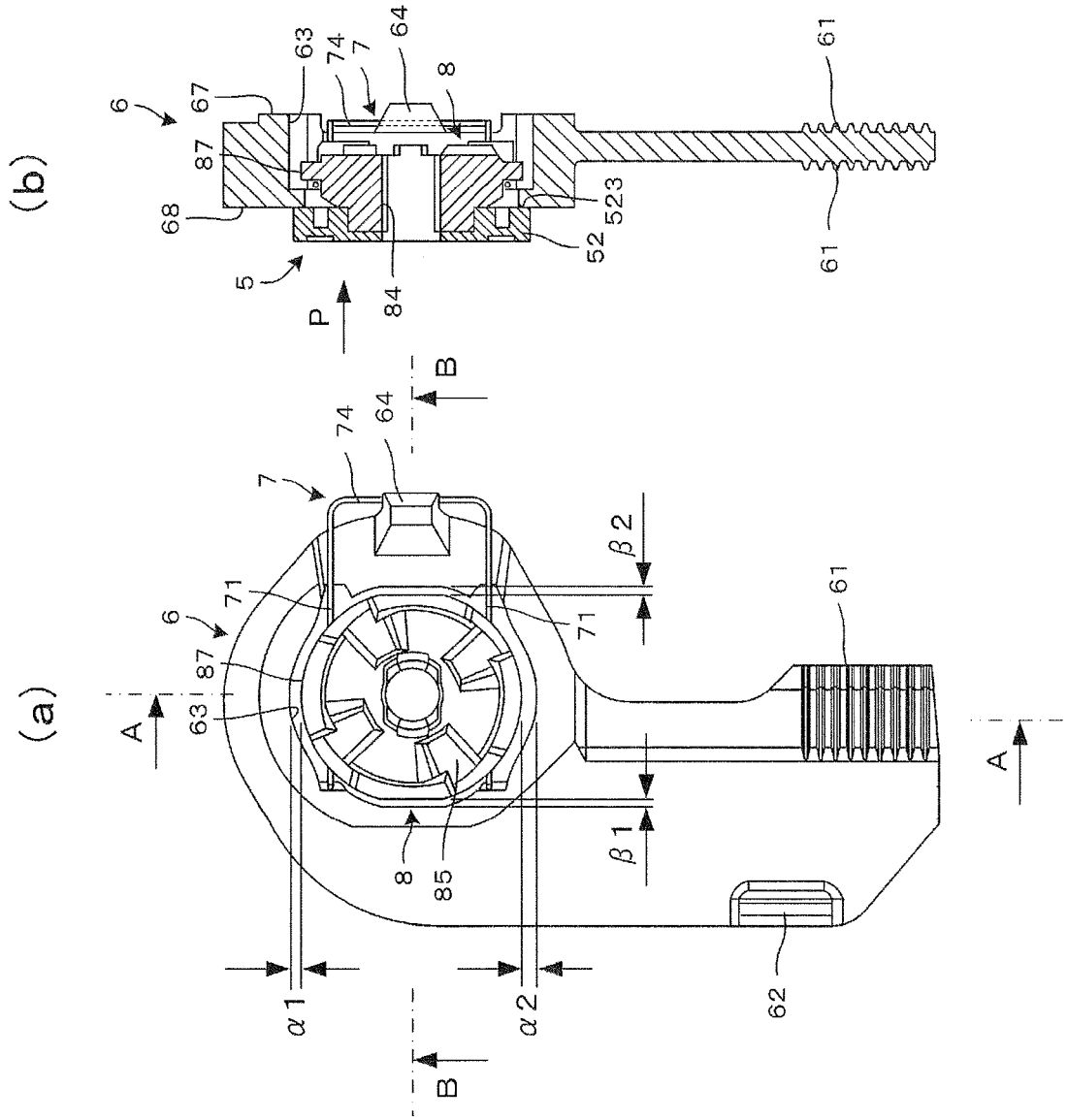
FIG. 10 shows a state of integrally assembling a movable tilt lock gear a fixed cam, and a wire spring by a tilt stopper, (*a*) is a front view, (*b*) is a sectional view taken along a line A-A of (*a*), and (*c*) is a sectional view taken along a line B-B of (*a*).
Figure 11:
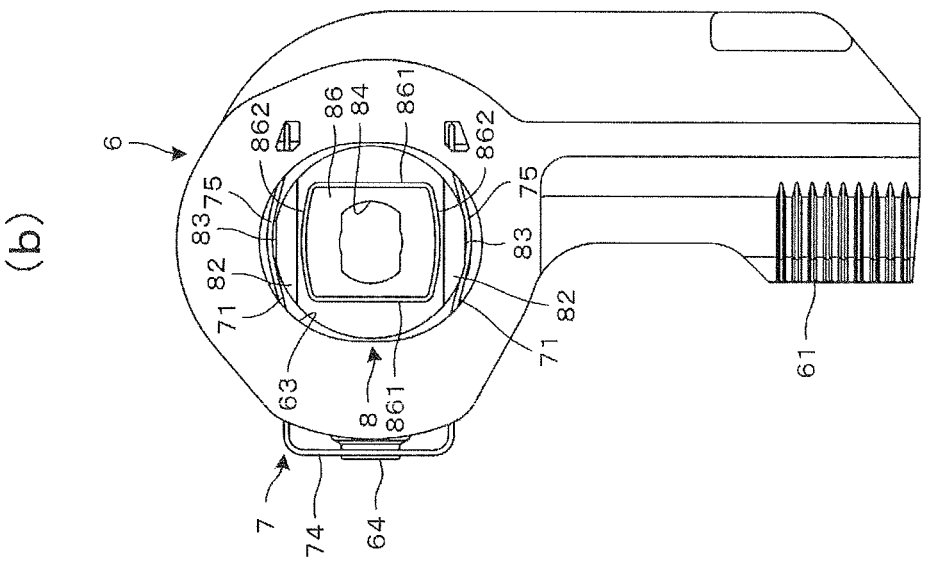
FIG. 11 (*a*) is a view viewing FIG. 10(*b*) in an arrow mark P direction, and FIG. 11 (*b*) is a front view showing a state of removing the tilt stopper from FIG. 11 (*a*).
Figure 11:
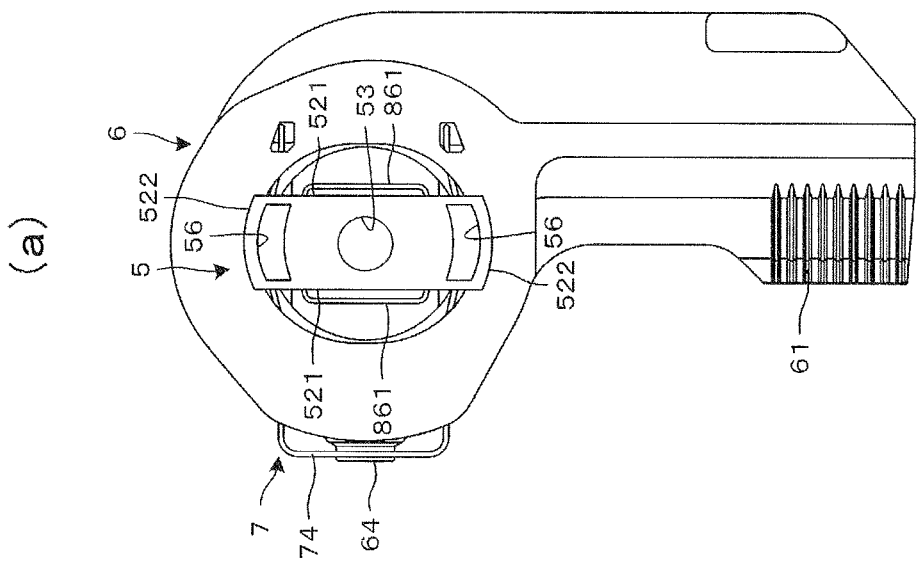

Four pieces of parts of the tilt stopper 5, the movable tilt lock gear 6, the wire spring (spring) 7, and the fixed cam 8 are integrally assembled and can be handled as one piece of a part, and therefore, an assembling efficiency is improved. That is, FIG. 10 shows a state of assembling the movable tilt lock gear 6, the fixed cam 8, and the wire spring 7 by the tilt stopper 5, (*a*) is a front view, (*b*) is a sectional view taken along a line A-A of (*a*), and (*c*) is a sectional view taken along a line B-B of (*a*). FIG. 11(*a*) is a view viewing FIG. 10(*b*) in an arrow mark P direction, and FIG. 11(*b*) is a front view showing a state of removing the tilt stopper 5 from FIG. 11(*a*).

Figure 12:
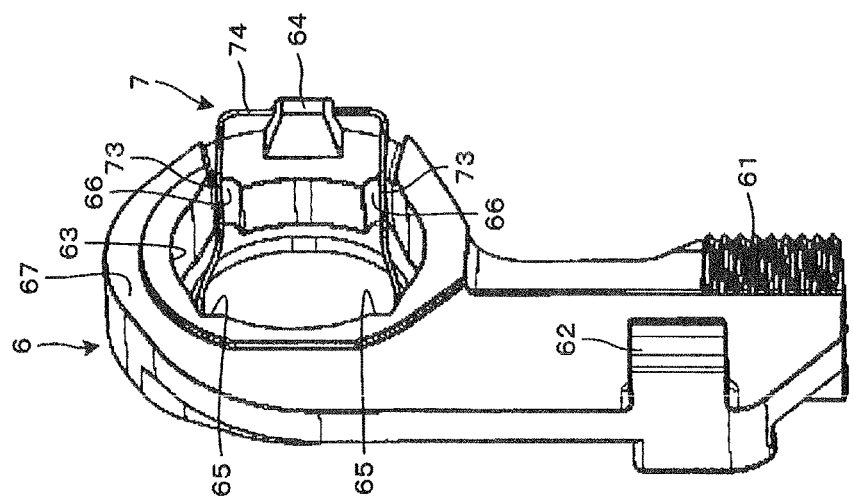
FIG. 12 illustrates perspective views showing a state of removing the fixed cam and the tilt stopper from FIG. 10, (*a*) is a perspective view viewing FIG. 10(*a*) from a skewed right side, and (*b*) is a perspective view viewing FIG. 10(*a*) from a skewed left side.
Figure 12:
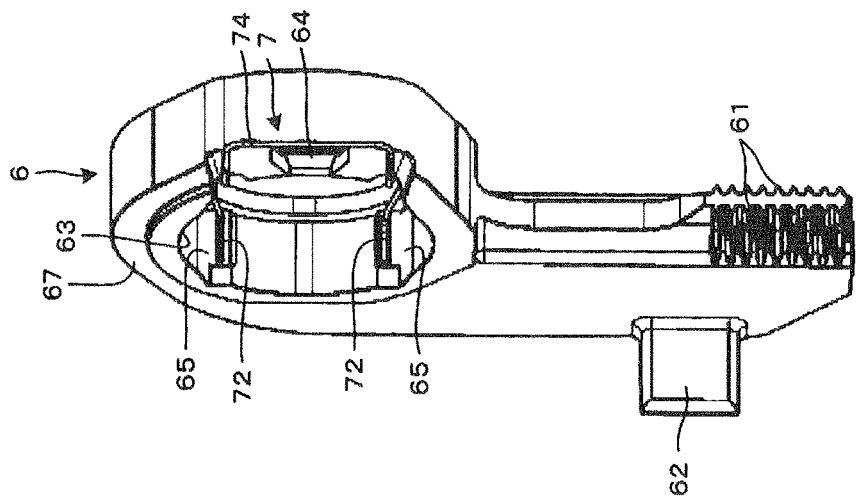
Figure 13:
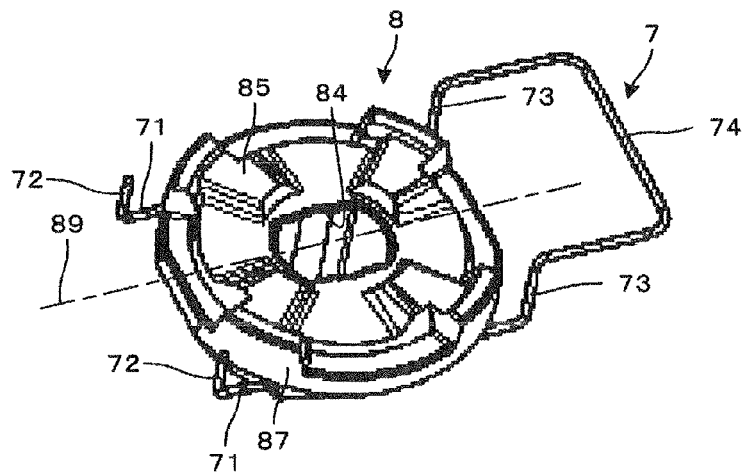
FIG. 13 shows a state of engaging the fixed cam and the wire spring, (*a*) is a perspective view viewing from a side of an inclined cam face of the fixed cam, (*b*) is a perspective view viewing from a side of a detent portion of the fixed cam, and (*c*) is a front view viewing from the side of the detent portion of the fixed cam.
Figure 13:
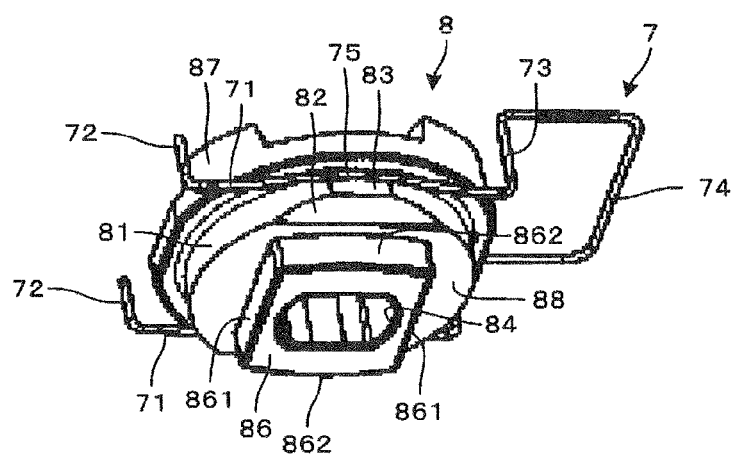
Figure 13:
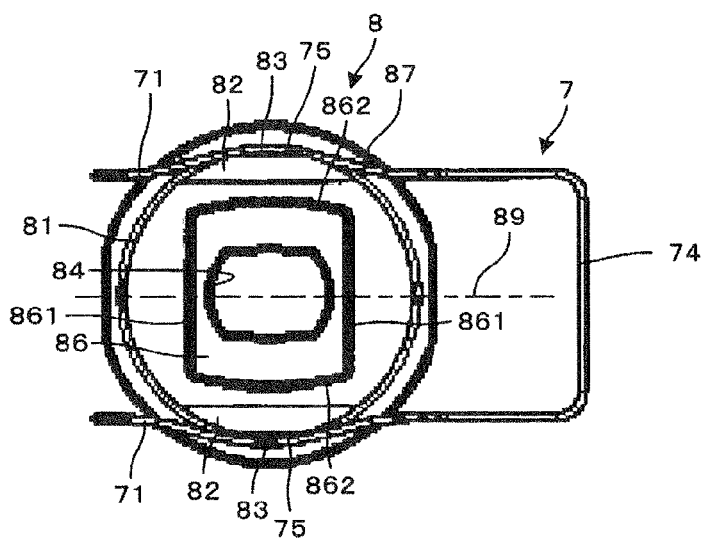

FIG. 12 illustrates perspective views showing a state of removing the fixed cam 8 and the tilt stopper 5 from FIG. 10, FIG. 12(*a*) is a perspective view viewing FIG. 10(*a*) from a skewed right side, and FIG. 12(*b*) is a perspective view viewing FIG. 10(*a*) from a skewed left side. FIG. 13 shows a state of engaging the fixed cam 8 and the wire spring 7, FIG. 13(*a*) is a perspective view viewing from an inclined cam face side of the fixed cam 8, FIG. 13(*b*) is a perspective view viewing from a detent portion side of the fixed cam 8, and FIG. 13(*c*) is a front view viewing from the detent portion side of the fixed cam 8.

The movable tilt lock gear 6 is formed slenderly in an up and down direction of the vehicle body, and gears 61 are formed at both side faces in the vehicle width direction on a lower side in view of the vehicle body of the movable tilt lock gear 6. The gear 61 is prolonged in a left and right direction of FIG. 10(*a*), and has a convergent tip, and plural pieces of the gears 61 are formed in the up and down direction of the vehicle body. Further, as shown in FIG. 2 and FIG. 4, the fixed tilt lock gear 47 is fixed to an outer side face 241 of the side plate 24 on the left side by a bolt 477. The fixed lock gear 47 is folded in a U-like shape, a front side in view of the vehicle body of the fixed tilt lock gear 47 is opened, and plural pieces of gears 471 are formed at both side faces on the inner sides in the vehicle width direction in the up and down direction of the vehicle body.

A protrusion 62 is formed at an outer side face in the vehicle width direction of the movable tilt lock gear 6, and the protrusion 62 is engaged with a recess portion 431 (refer to FIG. 6) formed at the operating lever 43. Therefore, the movable tilt lock gear 6 is pivoted in synchronism with a pivoting operation of the operating lever 43. When the operating lever 43 is pivoted in the counterclockwise direction in order to clamp the outer column 34 to the vehicle body attaching bracket 2, also the movable tilt lock gear 6 is pivoted in the counterclockwise direction, and the gear 61 of the movable tilt lock gear 6 is brought in mesh with the gear 471 of the fixed tilt lock gear 47, and a holding force in a tilting direction is made to be strong.

When the operating lever 43 is pivoted in the clockwise direction in order to unclamp the outer column 34 from the vehicle body attaching bracket 2, also the movable tilt lock gear 6 is pivoted in the clockwise direction, and the gear 61 of the movable tilt lock gear 6 is detached from the gear 471 of the fixed tilt lock gear 47.

The movable tilt lock gear 6 is formed with a through hole 63 in parallel with an axis center of the fastening rod 41 on an upper side in view of the vehicle body of the movable tilt lock gear 6, and the fixed cam 8 in a shape of a circular cylinder is inwardly fitted to the through hole 63. An inner diameter of the through hole 63 is formed to be large in the up and down direction of the vehicle body (up and down direction of FIG. 10(*a*)), and to be small in a front and rear direction of the vehicle body (left and right direction of FIG. 10(*a*)). As a result thereof, a gap between a major diameter outer peripheral face of the fixed cam 8 (outer peripheral face of the fixed cam 8 on a side of an inclined cam face 85) 87 and the through hole 63 is formed such that gaps α1 and α2 in the up and down direction of the vehicle body are larger than gaps β1 and β2 in the front and rear direction of the vehicle body, and is formed such that α1+α2>β1+β2. The movable tilt lock gear 6 is made to be able to move relative to the fixed cam 8 by amounts of the gaps α1, α2, β1, and β2.

Before inwardly fitting the fixed cam 8 to the movable tilt lock gear 6, the wire spring 7 is assembled to the movable tilt lock gear 6. As shown in FIG. 13, the wire spring 7 is formed by folding one piece of a wire, and is configured by a pair of arm portions 71, 71 in a shape of a straight line in parallel with each other, folded portions 72 and 73 which are formed at both ends of the arm portions 71, 71 and a connecting portion 74 in a channel-like shape which connects the folded portions 73, 73 on one side.

As shown in FIG. 12, the arm portions 71, 71 and the folded portions 72 and 73 of the wire spring 7 are inserted to the through hole 63 of the movable tilt lock gear 6, and the connecting portion 74 is caught by an engaging protrusion 64 of the movable tilt lock gear 6. The engaging protrusion 64 is formed at an end face 67 on a side of the movable cam 42 of the movable tilt lock gear 6. Then, the folded portions 72, 72 on one side are engaged with engaging recess portions 65, 65 formed at the through hole 63, and the folded portions 73, 73 on the other side are engaged with engaging recess portions 66, 66. As a result thereof, the wire spring 7 is attached to the movable tilt lock gear 6, while a movement thereof in a face in parallel with a paper face of FIG. 10(*a*) and a movement thereof in a direction orthogonal to the paper face of the FIG. 10(*a*) are prevented.

Successively, the fixed cam 8 is inwardly fitted to the through hole 63 of the movable tilt lock gear 6. Then, the arm portions 71, 71 of the wire spring 7 are elastically deformed with the folded portions 72 and 73 as fulcra, and the arm portions 71, 71 squeeze to hold an outer peripheral face (outer peripheral face on a side of the detent portion 86 of the fixed cam 8) 81 of the fixed cam 8 having a small diameter in a shape of a circular cylinder. The outer peripheral face 81 of the fixed cam 8 is formed with inclined faces 82 (refer to FIG. 13(*b*)). The inclined faces 82 are formed at 2 portions of the outer peripheral face 81 opposed to each other by 180 degrees, and guide the outer peripheral face 81 of the fixed cam 8 smoothly between the arm portions 71, 71 when the fixed cam 8 is inwardly fitted to the through hole 63.

Further, the outer peripheral face 81 of the fixed cam 8 is formed with flat faces 83 (refer to FIG. 13(*b*)). The flat faces 83 are formed at 2 portions of the outer peripheral face 81 opposed to each other by 180 degrees, and facilitate to match a phase of the fixed cam 8 to a phase of the movable tilt lock gear 6 when the fixed cam 8 is inwardly fitted to the through hole 63. Further, circular arc shape portions 75, 75 are respectively formed at middle positions in length directions of the arm portion 71, 71. A radius of curvature of the circular arc shape portion 75 is formed to be the same as a radius of curvature of the outer peripheral face 81 of the fixed cam 8. Therefore, a center of the through hole 63 of the movable tilt lock gear 6 is held at a center of the fixed cam 8 by urging forces of the arm portions 71, 71.

As shown in FIG. 13(*a*), one end face (end face opposed to the movable cam 42 when the fixed cam 8 is assembled to the fastening rod 41) of the fixed cam 8 is formed with an inclined cam face 85 which is engaged with the inclined cam face of the movable cam 42. Further, as shown in FIGS. 13(*b*) and (*c*), the detent portion 86 is formed at the other end face of the fixed cam 8 (end face opposed to the side plate 24 of the vehicle body attaching bracket 2 when the fixed cam 8 is assembled to the fastening rod 41).

The detent portion 86 is formed with flat faces 861, 861 formed by a width between two faces which is more or less narrower than the groove width of the tilt adjusting long groove 26. Therefore, the flat faces 861, 861 are fitted to the tilt adjusting long groove 26, the fixed cam 8 is made to stop rotating relative to the side plate 24 and is made to be slidable in a tilt adjusting direction by being guided by the tilt adjusting long groove 26. Further, circular arc faces 862, 862 are formed at end faces in the tilt adjusting direction (up and down direction of FIG. 13(*c*)) of the detent portion 86. As shown in FIGS. 13(*a*) and (*c*), the fixed cam 8 is formed by a shape having a line symmetry with a straight line 89 passing the center of the fixed cam 8 as a symmetric axis, and therefore, the fixed cam 8 has a structure by which assembling can be carried out even when a phase thereof is changed by 180 degrees. Also the movable cam 42 is formed by a shape having a line symmetry with a straight line passing a center of the movable cam 42 as a symmetric axis although not illustrated, and has a structure by which assembling can be carried out even when the phase is changed by 180 degrees.

Figure 14:
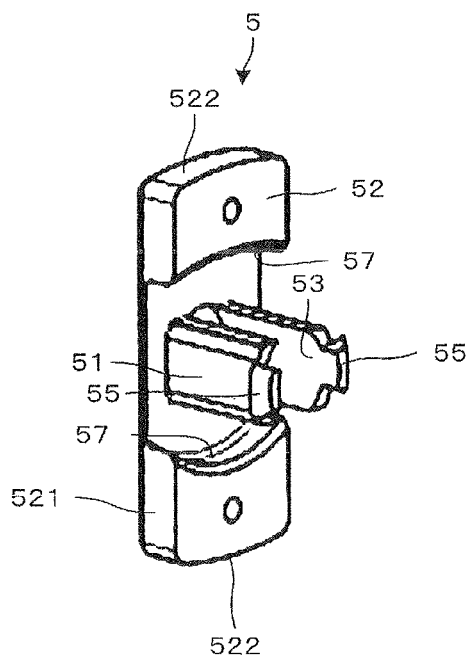
FIG. 14 illustrates perspective views showing a single member of the tilt stopper, (*a*) is a perspective view viewing the tilt stopper from a side of an engaging protrusion, and (*b*) is a perspective view viewing the tilt stopper from a side of a flange portion.
Figure 14:
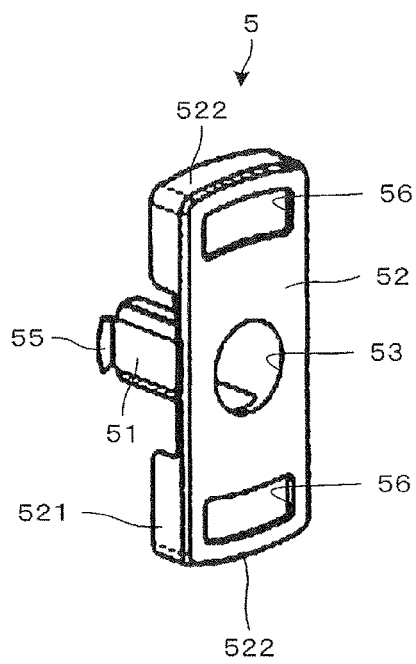
Figure 15:
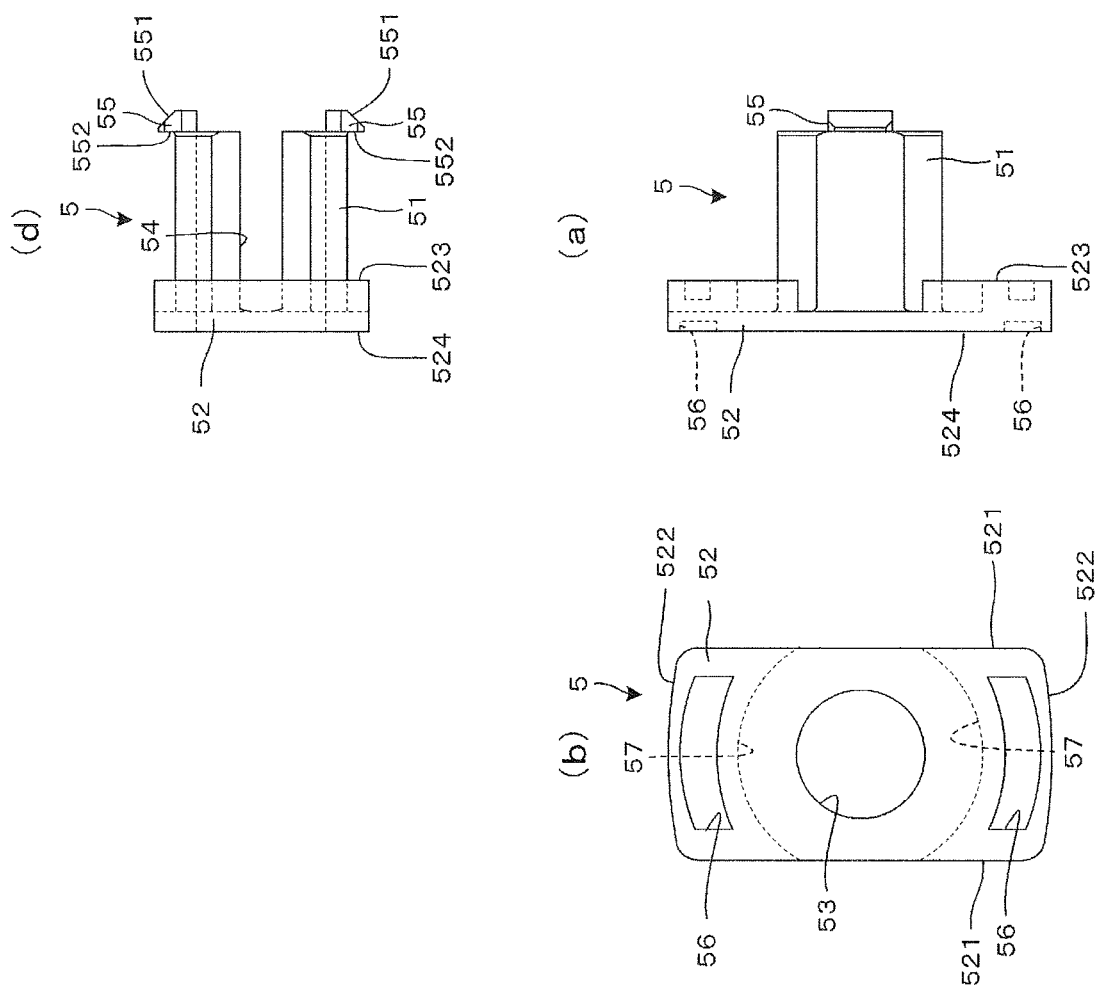
FIG. 15 illustrates views of apart showing a single member of the tilt stopper, (a) is a front view of the tilt stopper (b) is a left side view of (a), (c) is a right side view of (a), and (d) is a plane view of (a).

Successively, as shown in FIG. 10(*b*), the tilt stopper 5 is inserted to the through hole 84 formed at an axis center of the fixed cam 8 and 4 pieces of parts of the tilt stopper 5, the movable tilt lock gear 6, the wire spring 7, and the fixed cam 8 are integrally assembled. FIG. 14 illustrates perspective views showing a single member of the tilt stopper 5, FIG. 14(*a*) is a perspective view viewing the tilt stopper 5 from a side of an engaging protrusion, and FIG. 14(b) is a perspective view viewing the tilt stopper 5 from a side of a flange portion. FIG. 15 illustrates views of a part viewing a single member of the tilt stopper 5, FIG. 15(a) is a front view of the stopper 5, FIG. 15(b) is a left side view of FIG. 15(a), FIG. 15(c) is a right side view of FIG. 15(a), and FIG. 15(d) is a plane view of FIG. 15(a).

As shown in FIG. 14 through FIG. 15, the tilt stopper 5 is made of a synthetic resin, and is configured by a cylindrical portion 51 in a shape of a hollow circular cylinder, and a flange portion 52 in a shape of a rectangular thin plate integrally formed at one end (left end of FIG. 15(a)) of the cylindrical portion 51. The cylindrical portion 51 and the flange portion 52 are formed with a through hole 53 to which the fastening rod 41 is inserted, and slits 54, 54 communicating with the through hole 53 from an outer peripheral face of the cylindrical portion 51 are formed.

Other end (right end of FIG. 15(a)) is formed with engaging protrusions 55, 55 protruded from the outer peripheral face of the cylindrical portion 51 to an outer side in a radius direction. The engaging protrusions 55, 55 are formed with inclined faces 551, 551 on the other end side of the cylindrical portion 51, and one end side of the cylindrical portion 51 is formed with lock faces 552, 552 orthogonal to an axis center of the cylindrical portion 51. The inclined face 551 is inclined in a direction of being proximate to the axis center of the cylindrical portion 51 as proceeding to the other end side of the cylindrical portion 51.

The flange portion 52 is formed with flat faces 521, 521 formed by a width between two faces more or less narrower than the groove width of the tilt adjusting long groove 26. Therefore, the flat faces 521, 521 of the flange portion 52 are made to be slidable in the tilt adjusting direction by being inwardly fitted to the tilt adjusting long groove 26. A width between two faces of the flat faces 521, 521 of the flange portion 52 is formed to be more or less narrower than the width between two faces of the flat faces 861, 861 (refer to FIG. 11(a)).

Further, circular arc faces 522, 522 are formed at end faces in a tilt adjusting direction (up and down directions of FIG. 15(b) and FIG. 15(c)) of the flange portion 52. The circular arc faces 522, 522 are brought into contact with end portions of the tilt adjusting long groove 26 at tilt adjusting ends, and alleviate an impact sound. Further, a left end face (left end of FIG. 15(a)) 524 of the flange portion 52 is formed with circular arc shape grooves 56, 56 at end portions in the tilt adjusting direction of the flange portion 52 to thereby facilitate the circular arc faces 522, 522 to elastically deform. Therefore, when the circular arc faces 522, 522 are brought into contact with the end portions of the tilt adjusting long groove 26 at the tilt adjusting ends, the circular arc faces 522, 522 are elastically deformed, and impacts at the tilt adjusting ends can be alleviated.

Further, a right end face (right end of FIG. 15(a)) 523 of the flange portion 52 is formed with circular arc shape recess faces 57, 57. A radius of curvature of the circular arc shape recess faces 57, 57 is formed to be more or less larger than a radius of curvature of the circular arc faces 862, 862 of the fixed cam 8 described above.

As shown in FIGS. 10(b) and 10(c), the cylindrical portion 51 of the tilt stopper 5 is inserted to the through hole 84 formed at an axis center of the fixed cam 8. Then, the inclined faces 551 of the engaging protrusions 55 of the tilt stopper 5 are brought into contact with the through hole 84, the cylindrical portion 51 is contracted in a diameter thereof, and therefore, the cylindrical portion 51 can smoothly be inserted to the through hole 84.

When the cylindrical portion 51 of the tilt stopper 5 has been finished to be inserted to the through hole 84, the cylindrical portion 51 is enlarged in the diameter, and the lock faces 552 of the engaging protrusions 55 are engaged with an end face of the fixed cam 8 on a side of the inclined cam faces 85. Further, the circular arc shape recess faces 57, 57 of the tilt stopper 5 are outwardly fitted to the circular arc shape faces 862, 862 of the fixed cam 8. Further, a right end face 523 (refer to FIG. 10(b)) of the flange portion 52 of the tilt stopper 5 is brought into contact with an end face (on a side of the side plate 24) 68 of the movable tilt lock gear 6.

Therefore, when assembling has been finished, the movable tilt lock gear 6, the wire spring 7, and the fixed cam 8 are integrated by the tilt stopper 5, 4 pieces of the parts can be prevented from being scattered in the midst of transportation, and therefore, an assembling time period can be shortened. Further, positions of 4 pieces of the parts in the axial direction are not shifted from each other, and therefore, positions of the wire spring 7 and the fixed cam 8 in the axial direction can be held at constant positions. As a result thereof, by an elastic force of the wire spring 7, a center of the through hole 63 of the movable tilt lock gear 6 can stably be held at a center of the fixed cam 8.

An integrated article configured by 4 pieces of the parts of the tilt stopper 5, the movable tilt lock gear 6, the wire spring 7, and the fixed cam 8 assembling of which has been finished in this way is carried by the hand, and the flat faces 861, 861 of the detent portion 86 of the fixed cam 8 are inwardly fitted to the tilt adjusting long groove 26 of the side plate 24 of the vehicle body attaching bracket 2.

Next, the fastening rod 41 in the shape of the round bar to which the tilt stopper 48 is outwardly fitted is passed through the tilt adjusting long groove 27, the telescopic position adjusting long groove on the right side, the telescopic position adjusting long groove on the left side, and the tilt adjusting long groove 26. Successively, a left end of the fastening rod 41 is inserted to the through hole 53 of the tilt stopper 5 of the assembling article configured by 4 pieces of the parts. Thereafter, when the movable cam 42, the operating lever 43, the collar 44, and the thrust bearing 45 are outwardly fitted to a left end of the fastening rod 41, and the nut 46 is fastened to the left end of the fastening rod 41 to fix, assembling of the tilt clamp mechanism is finished.

The operating lever 43 is operated to pivot in the counterclockwise direction in order to clamp the outer column 34 to the vehicle body attaching bracket 2. Then, the fixed cam 8 is not rotated since the flat faces 861, 861 of the detent portion 86 of the fixed cam 8 are inwardly fitted to the tilt adjusting long groove 26 and the rotation is restricted, and a ridge of the inclined cam face of the movable cam 42 is mounted on a ridge of the inclined cam face 85 of the fixed cam 8. Therefore, an end face (refer to FIG. 10(c), FIG. 13(b)) 88 of the fixed cam 8 on the side of the detent portion 86 pushes the outer side face 21 of the side plate 24 on the right side. As described above, the rigidity of the side plate 24 on the left side at a vicinity of the tilt adjusting long groove 26 is formed to be large by the rib 243, and therefore, an elastic deformation thereof is restrained.

When the ridge of the inclined cam face of the movable cam 42 is mounted on the ridge of the inclined cam face 85 of the fixed cam 8, the fastening rod 41 is pulled to the left side of FIG. 4, and the circular arc shape head portion 411 pushes an outer side face 251 of the side plate 25 on the right side to an inner side. As described above, the rigidity of the vicinity of the tilt adjusting long groove 27 of the side plate 25 on the right side is formed to be small by the gap 253 and the slit 254, and therefore, the side plate 25 on the right side is elastically deformed considerably to the inner side, and the inner side face 252 of the side plate 25 on the right side strongly presses an outer side face of the clamp member on the right side of the outer column 34. As a result thereof, the outer side faces of the left and right clamp members of the outer column 34 are strongly squeezed between the inner side face 242 of the side plate 24 and the left side and the inner side face 252 of the side plate 25 on the right side.

In this way, the left and right clamp members of the outer column 34 can be fastened to the vehicle body attaching bracket 2 by a large holding force at a predetermined tilt adjusting position to thereby tiltingly be clamped. The tilt clamp mechanism of the present invention fastens the side plates 24, directly without interposing an elastic member, and therefore, the rigidity in tilting and clamping can be increased. Further, the clamp members are elastically deformed to the inner side in a direction of making the inner side faces of the clamp members proximate to each other, and a width of the slit of the outer column 34 is narrowed. Therefore, the inner peripheral face of the outer column 34 is contracted in the diameter, and the outer peripheral face of the inner column 31 is fastened to clamp (telescopically clamp).

Further, when the operating lever 43 is operated to pivot in the counterclockwise direction, also the movable tilt lock gear 6 is pivoted in the counterclockwise direction in synchronism with a pivoting operation of the operating lever 43. The fixed cam 8 is not rotated since the rotation is restricted by inwardly fitting the flat faces 861, 861 of the detent portion 86 of the fixed cam 8 to the tilt adjusting long groove 26, and both of the movable tilt lock gear 6 and the wire spring 7 are pivoted in the counterclockwise direction.

The arm portions 71, 71 of the wire spring 7 are slidably moved while being brought into contact with the outer peripheral face 81 in the shape of the circular cylinder of the fixed cam 8, and therefore, the center of the through hole 63 of the movable tilt lock gear 6 is held at the center of the fixed cam 8 by an urging force of the wire spring 7. Even when the outer column 34 is clamped to the vehicle body attaching bracket 2, the wire spring 7 does not receive a clamp force, and the arm portions 71, 71 of the wire spring 7 are only slidably moved while being brought into contact with the outer peripheral face 81 of the fixed cam 8 by a constant face pressure, and therefore, there is not a concern of reducing the durability of the wire spring 7 and the fixed cam 8.

When positions of the movable tilt lock gear 6 and the fixed tilt lock gear 47 in an up and down direction of the vehicle body do not coincide with each other, and ridges of the gear 61 of the movable tilt lock gear 6 and the gear 471 of the fixed tilt lock gear 47 are brought into contact with each other, the arm portions 71, 71 of the wire spring 7 are elastically deformed by amounts of the gaps α1 and α2 by a reaction force thereof. As a result thereof, the movable tilt lock gear 6 is moved more or less in the up and down direction of the vehicle body while the fixed cam 8 is being fixed, and the gear 61 of the movable tilt lock gear 6 and the gear 471 of the fixed tilt lock gear 6 are brought into a normal meshing state. Therefore, even when a driver is crashed to the steering wheel in second collision, the column is not moved in the tilting direction, and an air bag installed at the steering wheel can receive a passenger at an effective position.

The gear 61 is formed at the front end of the movable tilt lock gear 6 which is rotated centering on the fastening rod 41, and a distance from the center of the fastening rod 41 to the gear 61 is made to be long. Further, also a distance from the tilt adjusting long groove 26 and the fixed tilt lock gear 47 is made to be long. The movable tilt lock gear 6 is integrally molded, and the side plate 24 on the left side which is attached with the fixed tilt lock gear 47 is restrained from being elastically deformed by the rib 243. Therefore, positions of the fixed tilt lock gear 47 and the movable tilt lock gear 6 relative to each other in the vehicle width direction is not varied in tilting and clamping and telescopically clamping, and therefore, the movable tilt lock gear 6 and the fixed tilt lock gear 47 are smoothly brought in mesh with each other.

Further, when a driver is impacted to the steering wheel 103 in second collision, and a large impact force is operated, the fixed tilt lock gear 47 receives the impact force by transmitting the impact force to the vehicle body via the side plate 24, the upper plate 23, and the capsule 22. Further, the fixed tilt lock gear 47 is attached to a position remote from the upper plate 23, and therefore, by forming the rib 243 at the side plate 24, deformation of the side plate 24 is restrained, and the movable tilt lock gear is prevented from being loosened relative to the fixed tilt lock gear 47.

The gap 253 of the side plate 25 on the other side is formed at a portion of connecting the other side plate 25 and the upper plate 23, and is opened at the rear side in view of the vehicle body, and the tilt adjusting long groove 27 is formed on the lower side of the gap 253. Therefore, in tilting and clamping and in telescopically clamping, when the circular disk shape head portion 411 of the fastening rod 41 presses the side plate 25, the side plate 25 is made to be easy to deform, and therefore, fastening of the outer column 34 can smoothly be carried out.

Further, the gap 253 formed at the portion of connecting the upper plate 23 and the side plate 25 is opened on the rear side in view of the vehicle body. Therefore, when an excessively large impact force is exerted, the gap 253 is narrowed, the side plate 25 is brought into contact with the upper plate 23, and deformation of the side plate 25 in a tilting upper direction can be minimized.

When the gear 61 of the movable tilt lock gear 6 and the gear 471 of the fixed tilt lock gear 47 are brought into the normal meshing state, the arm portions 71, 71 of the wire spring 7 are moved from the outer peripheral face 81 in the shape of the circular cylinder of the fixed cam 8 to the flat face 83. As a result thereof, the arm portions 71, 71 urge the movable tilt lock gear 6 in a direction of pivoting in the counterclockwise direction, and therefore, the operating lever 43 is also urged in the direction of pivoting in the counterclockwise direction, and an effect of stopping the operating lever 43 from returning is produced.

When the operating lever 43 is operated to pivot in the clockwise direction in order to unclamp the outer column 34 from the vehicle body attaching bracket 2, also the movable tilt lock gear 6 is pivoted in the clockwise direction and meshing of the gear 61 of the movable tilt lock gear 6 and the gear 471 of the fixed tilt lock gear 47 is disengaged. Further, a ridge of the inclined cam face 85 of the fixed cam 8 and a valley of the inclined cam face of the movable cam 42 are brought in mesh with each other. Then, positions of the fixed cam 8 and the movable cam 42 in the axial direction are made to be proximate to each other relatively, and the side plate 25 of the vehicle body attaching bracket 2 is elastically recovered in a direction opposed to the sandwiching direction.

Thereby, the outer column 34 is brought into a state of being free relative to the side plates 24, and 25 of the vehicle body attaching bracket 2 (tilting is unclamped). Further, the clamp members of the outer column 34 are elastically recovered to outer sides in a direction of separating inner side faces of the clamp members from each other, and a width of the slit of the outer column 34 is widened. Therefore, the diameter of the inner peripheral face of the outer column 34 is enlarged, and the outer peripheral face of the inner column 31 is relaxed to be unclamped (telescopically unclamp).

In a state of tilting and unclamping and telescopically unclamping, the arm portions 71, 71 of the wire spring 7 are moved from the flat face 83 of the fixed cam 8 to the outer peripheral face 81 in the shape of the circular Cylinder. As a result thereof, the movable tilt lock gear 6 is moved more or less in the up and down direction of the vehicle body by the gaps α1, and α2 and the urging force of the wire spring 7, meshing of the movable tilt lock gear 6 and the fixed lock gear 47 is made to be easy to be disengaged, and when tilting and unclamping and telescopically unclamping are advanced thereafter, the center of the through hole 63 of the movable tilt lock gear 6 is recovered to the center of the fixed cam 8.

In the state of tilting and unclamping and telescopically unclamping, the adjustment of the steering wheel 103 in the titling direction can arbitrarily be carried out by displacing the outer column 34 in the tilting direction while guiding the tilt stopper 48, the tilt stopper 5, and the detent portion 86 of the fixed cam 8 by the tilt adjusting long groove 26 and 27 of the bracket 2. When the circular arc faces 522, 522 of the tilt stopper 5 are brought into contact with the end portions of the tilt adjusting long groove 26 at the tilt adjusting ends, the circular arc faces 522, 522 are elastically deformed, and impacts at the tilt adjusting ends can be alleviated.

Further, the adjustment of the steering wheel 103 in the telescopic direction can arbitrarily be carried out by displacing the outer column 34 in the telescopic direction along the outer peripheral face of the inner column 31 while guiding the telescopic position adjusting long groove of the outer column 34 by the fastening rod 31.

Figure 16:
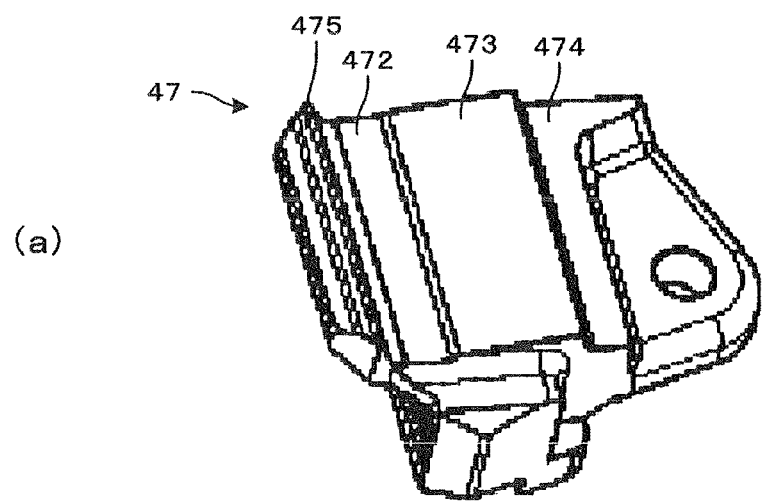
FIG. 16 illustrates perspective views showing a single member of a fixed tilt lock gear, (a) is a perspective view viewing the fixed tilt lock gear from a skewed lower side on an outer side in a vehicle width direction, and (b) is a perspective view viewing the fixed tilt lock gear from a side lower than the side of (a).
Figure 16:
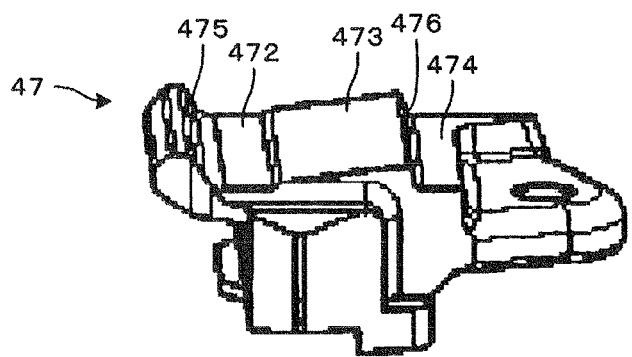
Figure 17:
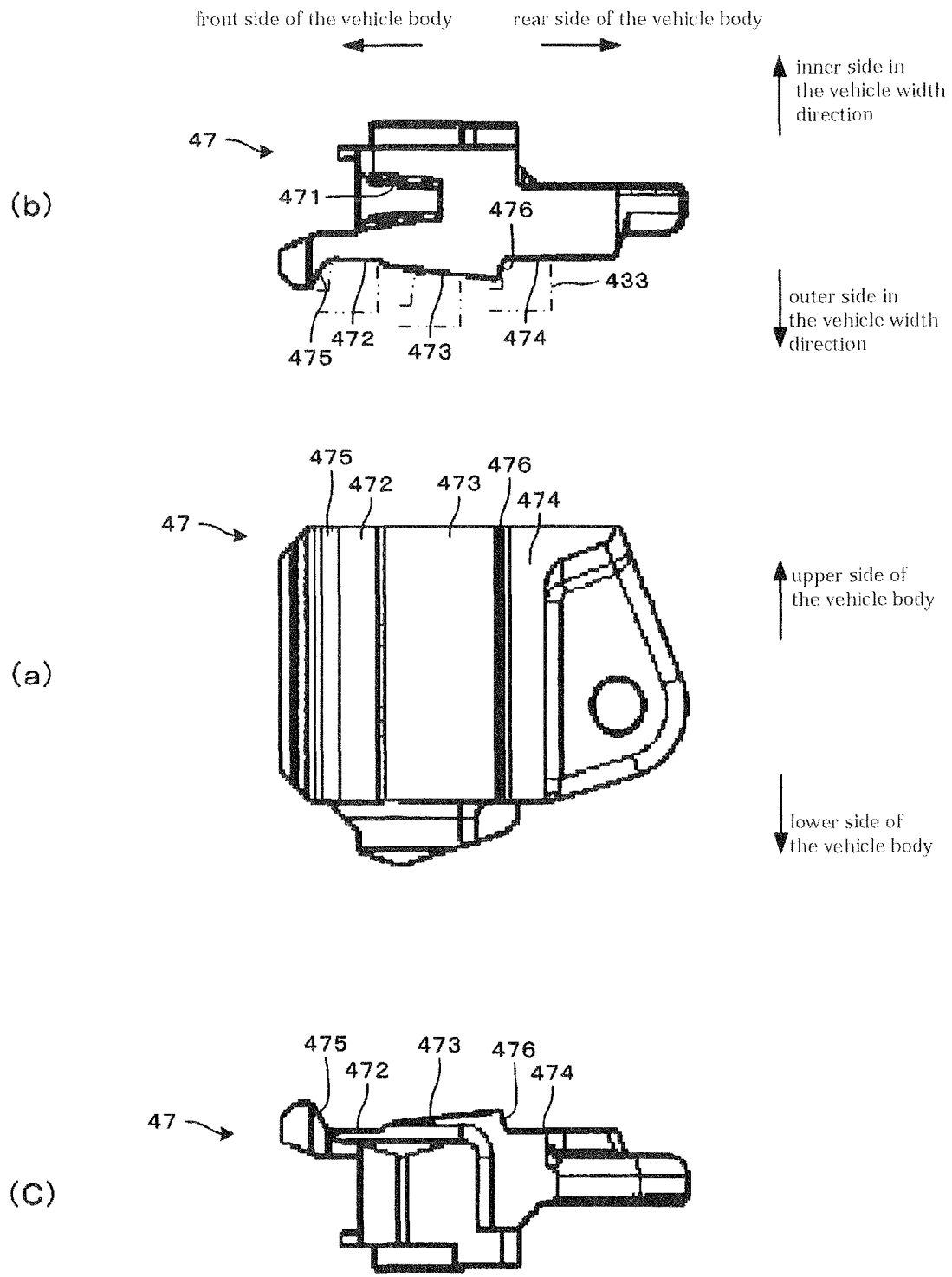
FIG. 17 illustrates views of apart showing a single member of the fixed tilt lock gear, (a) is a front view of the fixed tilt lock gear, (b) is a plane view of (a), and (c) is a bottom view of (a).

FIG. 16 illustrates perspective views showing a single member of the fixed tilt lock gear 47, FIG. 16(a) is a perspective view viewing the fixed tilt lock gear 47 from a skewed lower side on the outer side in the vehicle width direction, and FIG. 16(b) is a perspective view viewing the fixed tilt lock gear 47 from a side lower than the skewed lower side of FIG. 16(a). FIG. 17 illustrates views of a part showing a single member of the fixed tilt lock gear 47, FIG. 17(a) is a front view of the fixed tilt lock gear 47, FIG. 17(b) is a plane view of FIG. 17(a), and FIG. 17(c) is a bottom view of FIG. 17(a).

Figure 18:
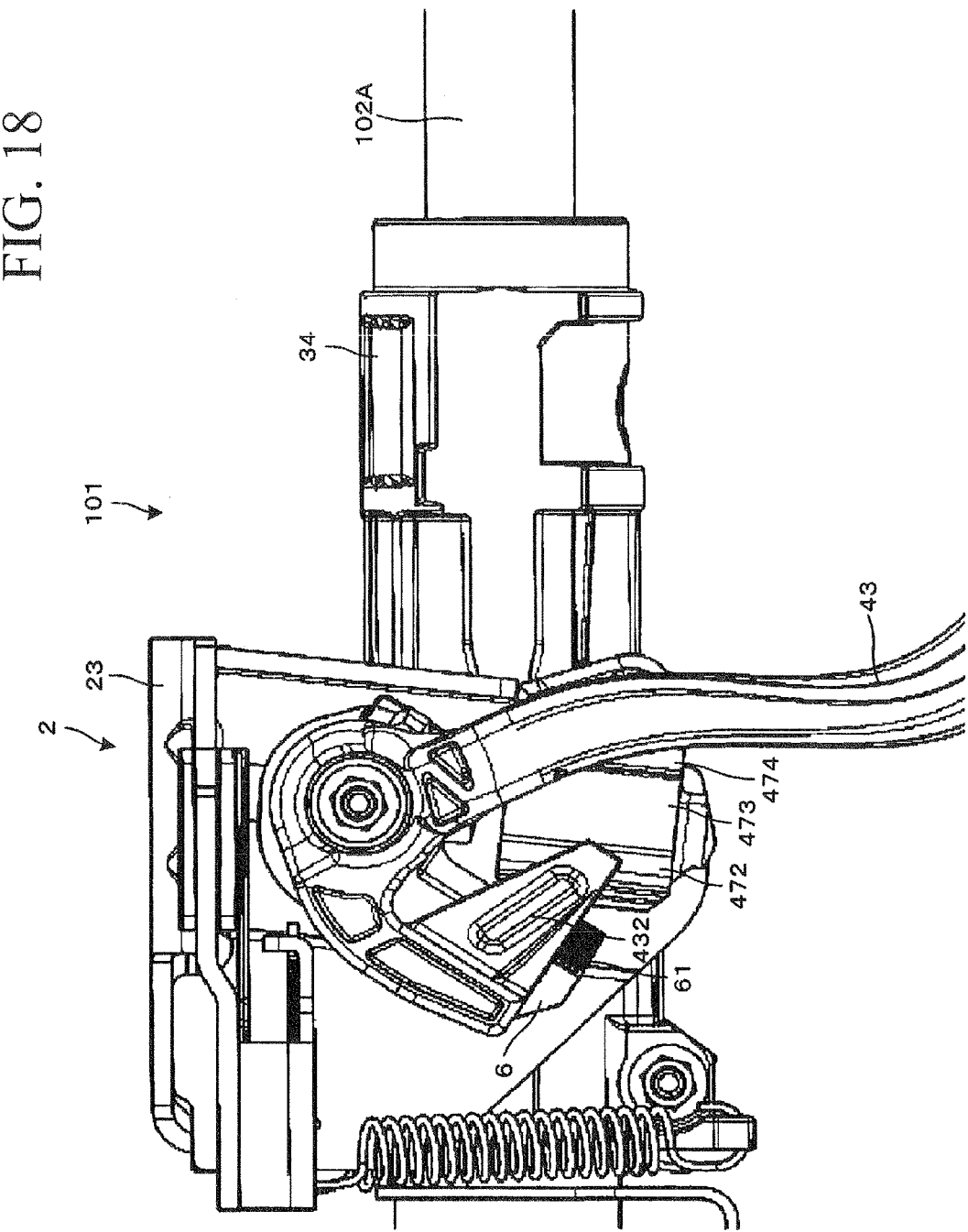
FIG. 18 is a front view of a vicinity of an operating lever showing a state of unclamping an outer column from the vehicle body attaching bracket by operating to pivot the operating lever in the clockwise direction.
Figure 19:
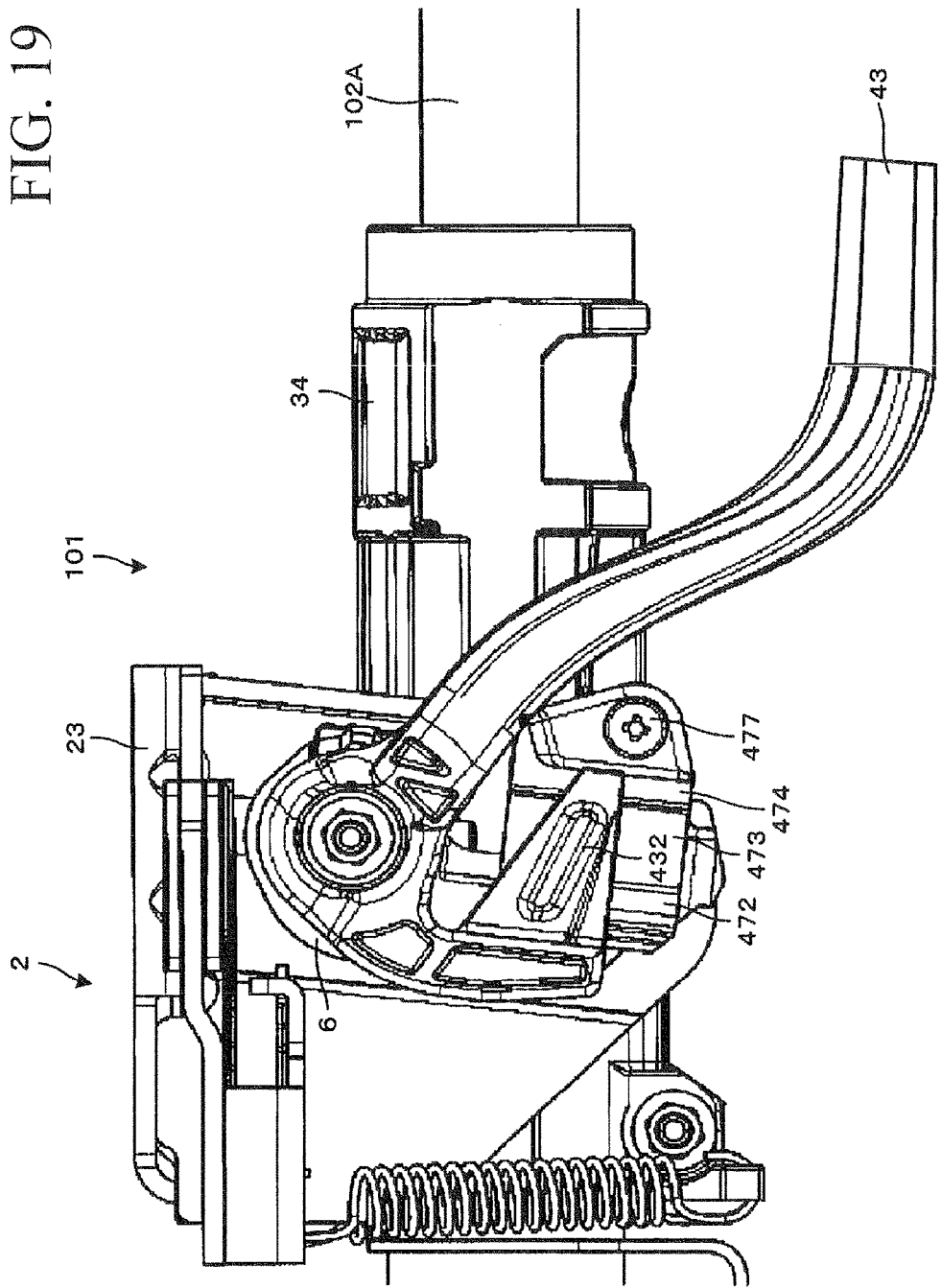
FIG. 19 is a front view of the vicinity of the operating lever showing a state of clamping the outer column to the vehicle body attaching bracket by operating to pivot the operating lever in the counterclockwise direction.
Figure 20:
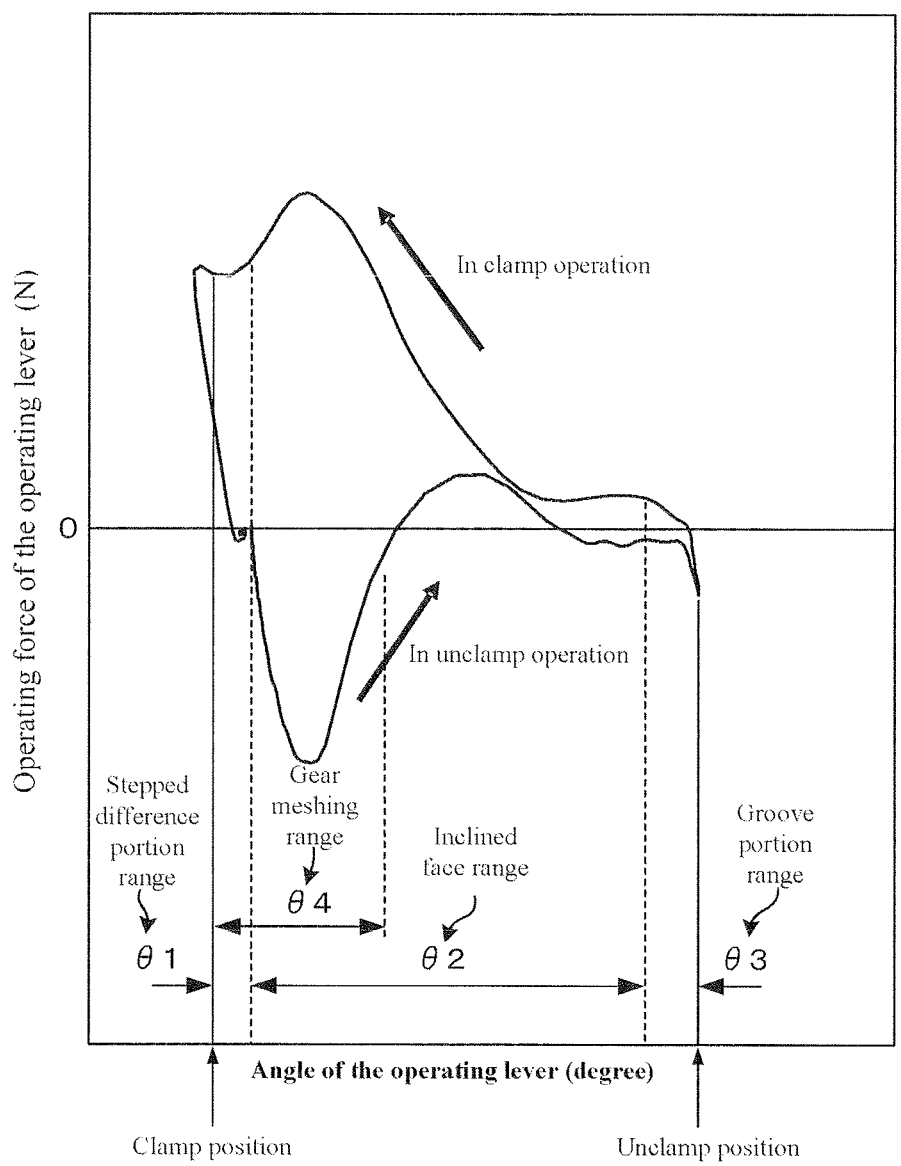
FIG. 20 is a graph showing a relationship between an angle of rotating the operating lever and an operating force which is necessary for operating the operating lever.

FIG. 18 is a front view of a vicinity of the operating lever 43 showing a state of unclamping the outer column 34 from the vehicle body attaching bracket 2 by operating to pivot the operating lever 43 in the clockwise direction. FIG. 19 is a front view of the vicinity of the operating lever 43 showing a state of clamping the outer column 34 to the vehicle body attaching bracket 2 by operating to pivot the operating lever 43 in the counterclockwise direction. FIG. 20 is a graph showing a relationship between a rotational angle of the operating lever 43 and an operating force necessary for operating the operating lever 43.

As shown in FIG. 4 and FIG. 6, the operating lever 43 made of a synthetic resin is formed with an engaging protrusion 433 at a front end of an elastic deforming portion 432 in a shape of a thin plate. The engaging protrusion 433 is formed by protruding to the outer side face 241 of the side plate 24. As shown in FIG. 16 and FIG. 17, an outer side face of the fixed tilt lock gear 47 is formed with a sliding contact face configured by a groove portion 472, an inclined face 473, and a stepped difference portion 474. The engaging protrusion 433 always exerts an urging force to an outer side in the vehicle width direction to the operating lever 43 by elastically deforming the elastic deforming portion 432, and slidingly moving the elastic deforming portion 432 by bringing the elastic deforming portion 432 always in contact with the sliding contact face configured by the groove portion 472, the inclined face 473, and the stepped difference portion 474. Therefore, play of the operating lever 43 is excluded, and an operating feeling of the operating lever 43 is promoted.

A length of the groove portion 472, the inclined face 473, and the stepped difference portion 474 in the up and down direction of the vehicle body (a length in an up and down direction of FIG. 17(a)) is formed to be more or less longer than a tilt adjusting length of the outer column 34. The groove portion 472 is formed by being recessed to an inner side in the vehicle width direction (upper side of FIG. 17(b)) more than the front end in view of the vehicle body of the inclined face 473 (left end of FIG. 17(b)), and is in parallel with the outer side face 241 of the side plate 24, and a length in the front and rear direction of the vehicle body (length in a left and right direction of FIG. 17(b)) is formed to be more or less longer than a length in the front and rear direction of the vehicle body of the engaging protrusion 433. A front end in view of the vehicle body of the groove portion 472 is formed with a wall portion 475 raised to the outer side in the vehicle width direction (lower side of FIG. 17(b)) by a steep slope.

The inclined face 473 is formed to be heightened by a gradual inclination to the outer side in the vehicle width direction as proceeding to the rear side of the vehicle body. A rear end in view of the vehicle body of the inclined face 473 is formed with a steep inclined face 476 which is lowered to the inner side in the vehicle width direction (upper side of FIG. 17(b)) by a steep slope and connected to the stepped difference portion 474. The stepped difference portion 474 is in parallel with the outer side face 241 of the side plate 24, and a length thereof in the front and rear direction of the vehicle body (length in a left and right direction of FIG. 17(b)) is formed to be more or less longer than a length in the front and rear direction of the vehicle body of the engaging protrusion 433.

FIG. 18 is a front view of a vicinity of the operating lever 43 showing a state of unclamping the outer column 34 from the vehicle body attaching bracket 2. As shown in FIG. 18, at an unclamping position, the engaging protrusion 433 is engaged with the groove portion 472. The groove portion 472 is interposed between the wall portion 475 and the front end in view of the vehicle body of the inclined face 473, and is formed to be more or less longer than the tilt adjusting length of the outer column 34. Therefore, in tilt adjustment of the outer column 34, the engaging protrusion 433 is moved by being guided by the groove portion 472, and restricts the operating lever 43 from being rotated. Therefore, the operating lever 43 is not rattled in the tilt adjustment, and a meshing strange sound produced by incomplete meshing of the movable tilt lock gear 6 and the fixed tilt lock gear 47 can be prevented.

When the operating lever 43 is operated to pivot in the counterclockwise direction in order to clamp the outer column to the vehicle body attaching bracket 2, the engaging protrusion 433 is moved from the groove portion 472 to the inclined face 473, and is slidably moved along the inclined face 473. As shown in FIG. 20, an operating force of the operating lever 43 is gradually increased. When a ridge of the inclined cam face of the movable cam 42 is mounted on a ridge of the inclined face 85 of the fixed cam 8, the operating force of the operating lever 43 is abruptly increased, and the engaging protrusion 433 is moved to the stepped difference portion 474 by passing the steep inclined face 476. FIG. 19 is a front view of a vicinity of the operating lever 43 showing a state of clamping the outer column 34 to the vehicle body attaching bracket 2.

The ridge of the inclined cam face of the movable cam 42 is mounted on the ridge of the inclined cam face 85 of the inclined cam 8, and therefore, simultaneously with strongly squeezing the outer column 34 between the side plate 24 on the left side and the side plate 25 on the right side, the movable tilt lock gear 6 is brought in mesh with the fixed tilt lock gear 47, and the clamping operation is finished. When the engaging protrusion 433 is engaged with the stepped difference portion 474, as shown in FIG. 20, the operating force of the operating lever 43 is rapidly reduced, a clinking click sound or a click feeling is brought about, a clear operating feeling of firmly carrying out clamping is brought about, and therefore, the operating feeling is excellent.

In order to pivot the operating lever 43 from the clamp position to the unclamp position, it is necessary that the engaging protrusion 433 rides over the steep inclined face 476. Therefore, as shown in FIG. 20, it is necessary to exert a large operating force to the operating lever 43, and therefore, the operating lever 43 can be prevented from operating to unclamp erroneously.

When the operating lever 43 is operated to pivot in the clockwise direction in order to unclamp the outer column 34 from the vehicle body attaching bracket 2, the engaging protrusion 433 is moved from the stepped difference portion 474 to the inclined face 473 by passing the steep inclined face 476, and is slidably moved along the inclined face 473. As shown in FIG. 20, although a large operating force is needed when the engaging protrusion 433 passes the steep inclined face 476, when the ridge of the inclined cam face of the movable cam 42 is deviated from the ridge of the inclined cam face 85 of the fixed cam 8, and the engaging protrusion 433 is moved to the inclined face 473, the operating force of the operating lever 43 is rapidly reduced.

When the operating lever 43 is operated to pivot in the clockwise direction, also the movable tilt lock gear 6 is pivoted in the clockwise direction, and meshing of the movable tilt lock gear 6 and the fixed tilt lock gear 47 is disengaged. Further, the ridge of the inclined cam face 85 of the fixed cam 8 and the valley of the inclined cam face of the movable cam 42 are brought in mesh with each other, and the outer column 34 is brought into a state of being free from the side plates 24 and 25 of the vehicle body attaching bracket 2 (tilting is unclamped).

As shown in FIG. 20, by bringing the engaging protrusion 433 and the inclined face 473 into contact with each other, the operating lever 43 is operated with an urging force in an unclamping direction (fastening releasing direction). Therefore, even when the hand is detached from the operating lever 43 at a middle position of the clamp position and the unclamp position, the operating lever 43 is automatically moved to the unclamp position. Therefore, an erroneous operation of stopping the operating lever 43 at the middle position can be prevented, and the meshing strange sound produced by the incomplete meshing of the movable tilt lock gear 6 and the fixed tilt lock gear 47 can be prevented. An inclination direction of the inclined face 473 may be formed in a direction of exerting the urging force in the clamp direction to the operating lever 43.

The engaging protrusion 433 is formed integrally with the operating lever 43, also a sliding contact face configured by the groove portion 472, the inclined face 473, and the stepped difference portion 474 is formed on the outer side face of the tilt lock gear 47, and therefore, a number of parts and a number of integrating steps can be reduced, and the production cost can be reduced.

Although according to the embodiment described above, the explanation has been given of the case of applying the present invention to the steering device of the tilt telescopic type which can carry out both of the tilt position adjustment and the telescopic position adjustment, the present invention may be applied to a steering device of a tilt type which can carry out only a tilt position adjustment.

DESCRIPTION OF THE REFERENCE NUMERALS AND SIGNS 101 steering device
102 steering shaft
102A upper steering shaft
103 steering wheel
104 universal joint
105 intermediate shaft
106 universal joint
107 steering gear
108 tie rod
2 vehicle body attaching bracket
22 capsule
23 upper plate
24 side plate
241 outer side face
242 inner side face
243 rib
244 rib
25 side plate
251 outer side face
252 inner side face
253 gap
254 slit
255 welding
26, 27 tilt adjusting long grooves
31 inner column
32 steering assisting portion
321 electric motor
322 reduction gearbox portion
323 output shaft
33 bracket
34 outer column
41 fastening rod
411 circular disk shape head portion
412 detent portion
42 movable cam
43 operating lever
431 recess portion
432 elastic deformation portion
433 engaging protrusion
44 collar
45 thrust bearing
46 nut
47 fixed tilt lock gear
471 gear
472 groove portion
473 inclined face
474 stepped difference portion
475 wall portion
476 steep inclined face
477 bolt
48 tilt stopper
5 tilt stopper
51 cylindrical portion
52 flange portion
521 flat face
522 circular arc face
523 right end face
524 left end face
53 through hole
54 slit
55 engaging protrusion 551 inclined face
552 lock face
56 circular arc shape groove
57 circular arc shape recess face
6 movable tilt lock gear
61 gear
62 protrusion
63 through hole
64 engaging protrusion
65, 66 engaging recess portions
67 end face
68 end face
7 wire spring (spring)
71 arm portion
72, 73 folded portions
74 connecting portion
75 circular arc shape portion
8 fixed cam
81 outer peripheral face
82 inclined face
83 flat face
84 through hole
85 inclined cam face
86 detent portion
861 flat face
862 circular arc face
87 major diameter outer peripheral face
88 end face
89 straight line (symmetric axis)

The invention claimed is:

1. A steering device, comprising:
   a vehicle body attaching bracket which can be attached to a vehicle body;
   a column in which a tilt position thereof is supported adjustably by the vehicle body attaching bracket, and a steering shaft mounted with a steering wheel is axially supported pivotably;
   a fastening rod which is inserted to a tilt adjusting long groove formed at a side plate and the column in order to fasten to clamp the column to a left and right pair of the side plates of the vehicle body attaching bracket at a desired tilt position;
   a fixed cam which is supported by one end of the fastening rod and presses an inner side face of one of the side plates of the vehicle body attaching bracket to the column;
   a movable cam which is supported pivotably by the one end of the fastening rod along with an operating lever opposedly to the fixed cam;
   a cam face which is provided to each of faces of the fixed cam and the movable cam opposed to each other, and presses the movable cam to the fixed cam relatively in an axial direction;
   a detent portion which is formed at the fixed cam in order to make the fixed cam unable to rotate relative to the movable cam, is inwardly fitted to the tilt adjusting long groove, and is made to be slidable along the tilt adjusting long groove in adjusting a tilt position of the column;
   a fixed tilt lock gear which is attached to an outer side face of the one of side plates of the vehicle body attaching bracket;
   a movable tilt lock gear which is pivoted in synchronism with an operation of pivoting the operating lever and can be brought in mesh with the fixed tilt lock gear; and
   a rib which is formed along the tilt adjusting long groove at a vicinity of the tilt adjusting long groove of the one of side plates, and restrains an elastic deformation of the one of side plate when the column is fastened to clamp.

2. The steering device according to claim 1, wherein the rib is formed between the fixed tilt lock gear and an upper plate of the vehicle body attaching bracket.

3. The steering device according to claim 1, further comprising:
   a gap which is formed at a portion of connecting the other of side plates of the vehicle body attaching bracket to the upper plate of the vehicle body attaching bracket, and facilitates an elastic deformation of the other of side plates when the column is fastened to clamp.

4. The steering device according to claim 3, wherein the gap is opened on a rear side thereof in view of the vehicle body.

5. The steering device according to claim 1, wherein:
   the movable tilt lock gear which is outwardly fitted to the fixed cam movably in a tilting direction; and
   a spring which is interposed between the movable tilt lock gear and the fixed cam, sandwiches an outer peripheral face of the fixed cam, and elastically supports a movement of the movable tilt lock gear in the tilting direction relative to the fixed cam.

6. The steering device according to claim 5, wherein when ridges of the movable tilt lock gear and the fixed tilt lock gear are brought into contact with each other in fastening the column to the vehicle body attaching bracket, the spring is elastically deformed by a reaction force thereof, and the movable tilt lock gear is moved in the tilting direction relative to the fixed tilt lock gear.

7. The steering device according to claim 6, wherein when the column is released from fastening the vehicle body attaching bracket, meshing of the movable tilt lock gear to the fixed tilt lock gear is made to be easy to be disengaged by a gap between the fixed cam and the movable tilt lock gear in an up and down direction of the vehicle body.

* * * * *